United States Patent [19]

Howse et al.

[11] 4,404,551
[45] Sep. 13, 1983

[54] PLURAL VIDEO KEYBOARD ACCESS SYSTEM

[75] Inventors: Peter Howse, Pembury; Dennis Cookson, Chelmsford; Stephen P. Lane, Gillingham, all of England

[73] Assignee: Reuters Limited, London, England

[21] Appl. No.: 254,136

[22] Filed: Apr. 14, 1981

[51] Int. Cl.³ .............................................. G06F 3/14
[52] U.S. Cl. .................................. 340/711; 364/146; 364/189
[58] Field of Search ................. 340/711; 364/146, 189

[56] References Cited

U.S. PATENT DOCUMENTS

| | | | |
|---|---|---|---|
| 3,903,402 | 9/1975 | Petit | 364/189 |
| 3,909,818 | 9/1975 | Dalke | 340/711 |
| 4,001,807 | 1/1977 | Dallimonti | 364/189 |
| 4,122,519 | 10/1978 | Bielawski | 364/146 |
| 4,143,360 | 3/1979 | Bernhart | 340/711 |
| 4,191,956 | 3/1980 | Groothuis | 340/711 |

OTHER PUBLICATIONS

Reuters Monitor System, Jan. 1981.
Avitel 3000 Series, Video 8x1 Switch, USW 3077, Avitel Electronics Limited, Aug. 1980.

Primary Examiner—Michael A. Masinick
Attorney, Agent, or Firm—Hubble, Cohen, Stiefel & Gross

[57] ABSTRACT

A video communication network (20) capable of providing a plurality of simultaneous textual data video frames to a plurality of keystations (22, 24) from a plurality of computer systems comprising at least two different data bases having incompatible keyboard protocols or character codes (40, 47, 46a, 46b) employs a single keyboard (28, 38) at the keystation (22, 24) to both selectively communicate with various different data base computer systems (40, 47, 46a, 46b) and enable keyboard generated dynamic selection of a textual data video display from a multiplexed plurality of simultaneously provided composite video signals corresponding to the plurality of video frames. Each keyboard (28, 38) may control anywhere from one VDU (26) up to four such VDUs (30, 32, 34, 36), by way of example. The keyboard (28, 38) is connected to a keyboard display driver (42a, 42b) which interfaces the keyboard (28, 38) to the various computer systems (40, 47, 46a, 46b), such as host and subscriber computer systems, and to a video matrix switch (44a, 44b). A keyboard code converter (48a, 48b) is connected between the keyboard display driver (42a, 42b) and an incompatible computer system (40) for converting incompatible keyboard character codes from the keyboard (28, 38) into codes compatible with the subscriber system (40) with no such conversion being required, for example, for the host computer system.

24 Claims, 27 Drawing Figures

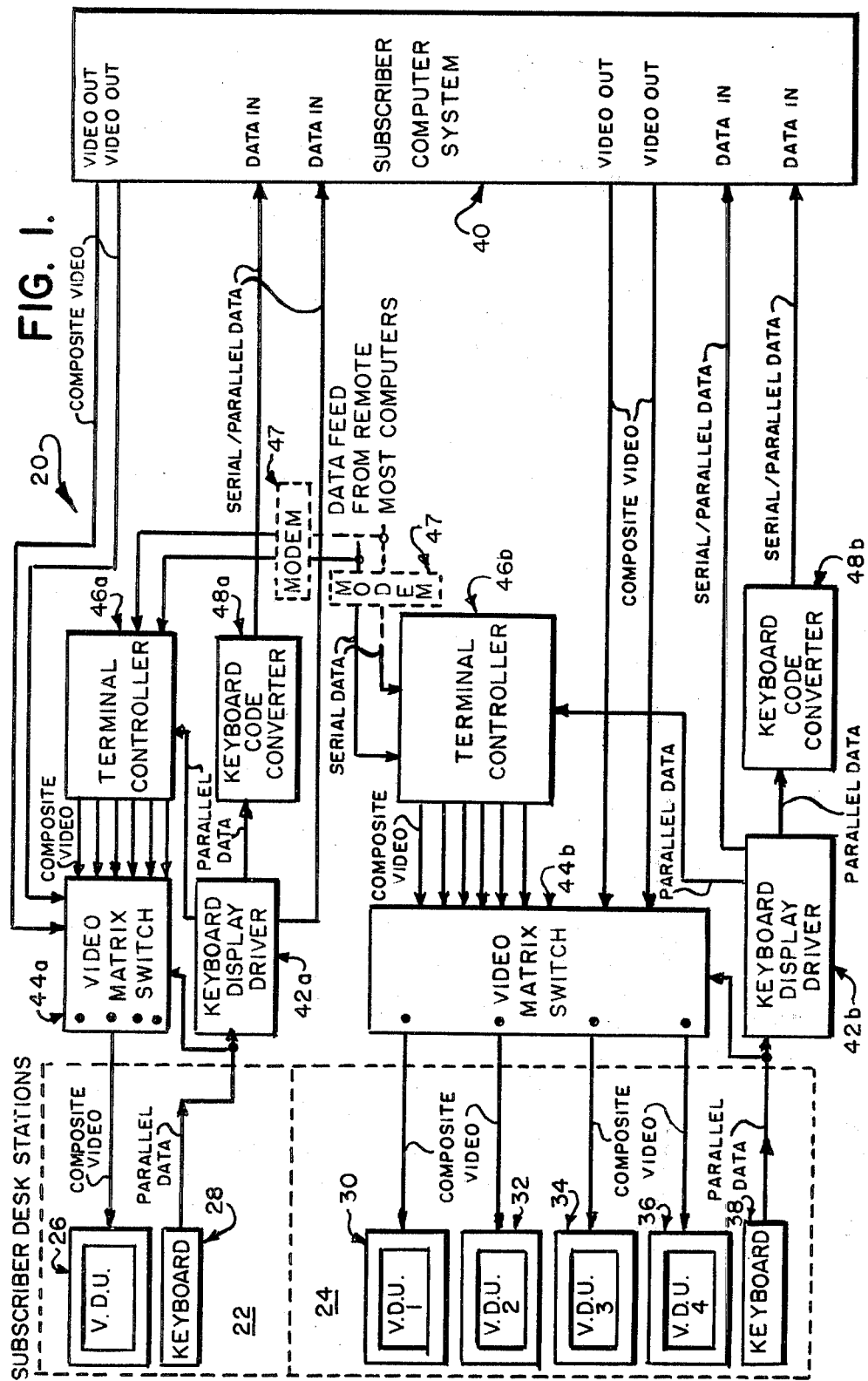

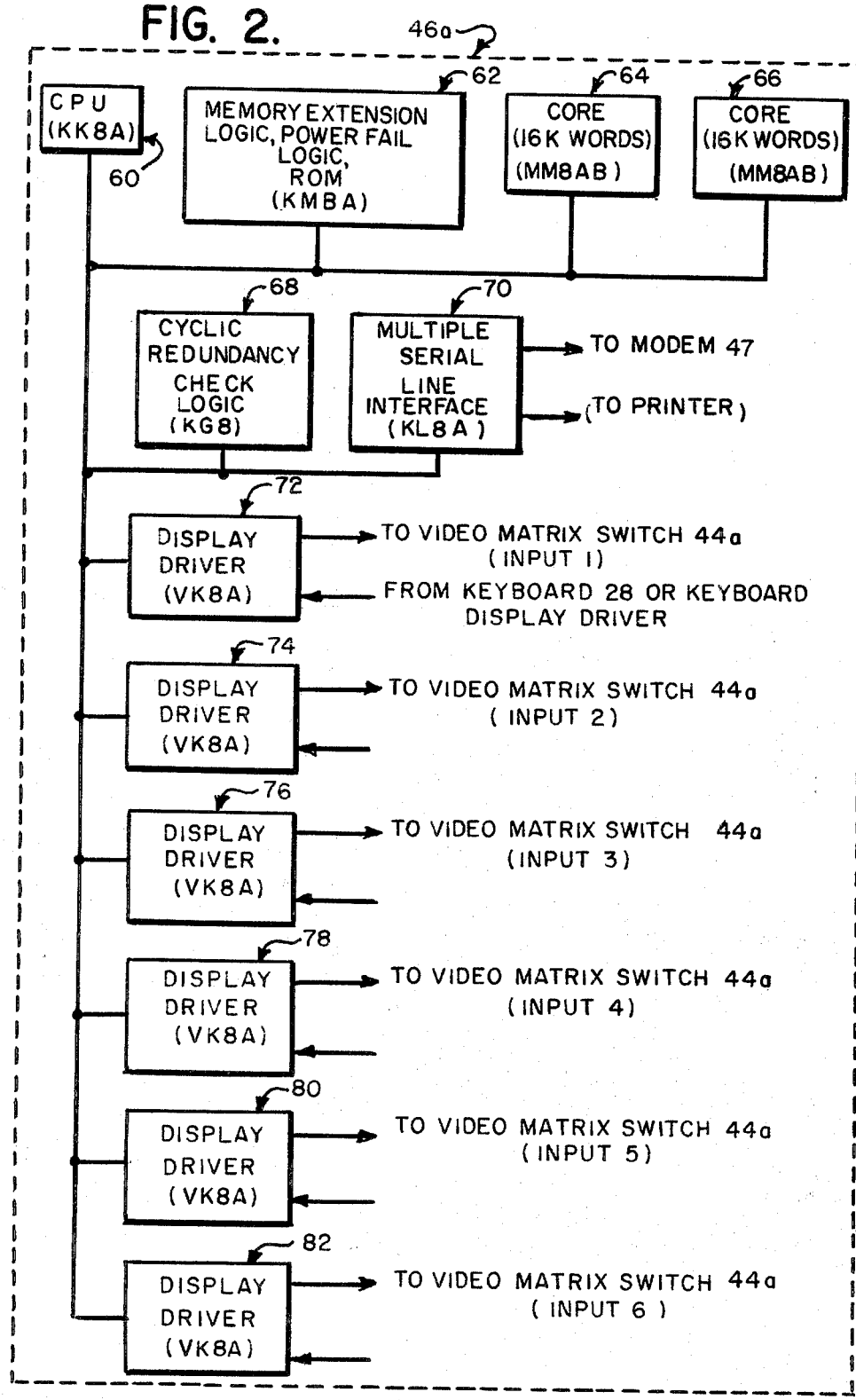

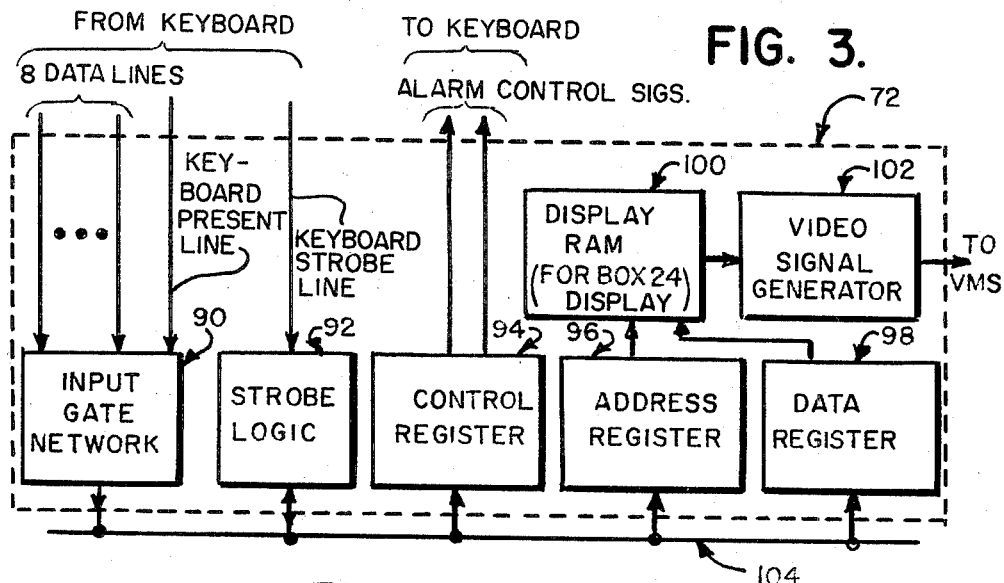
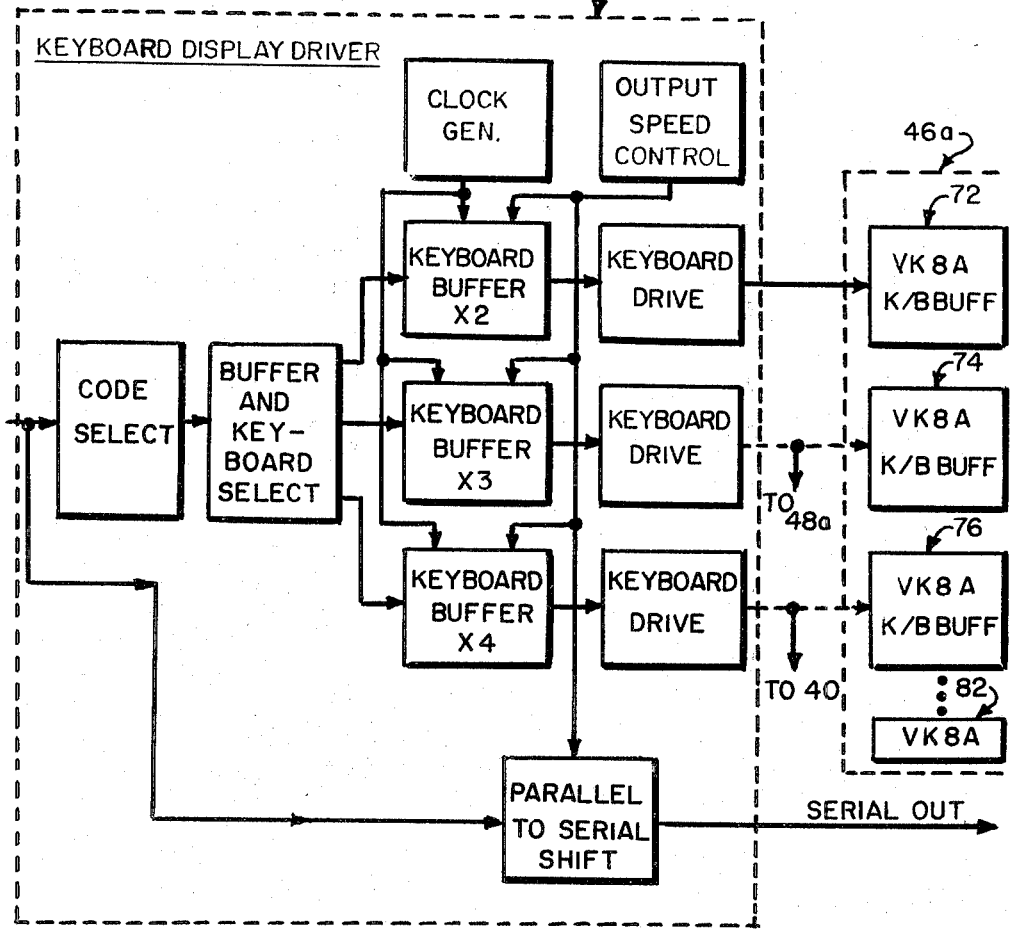

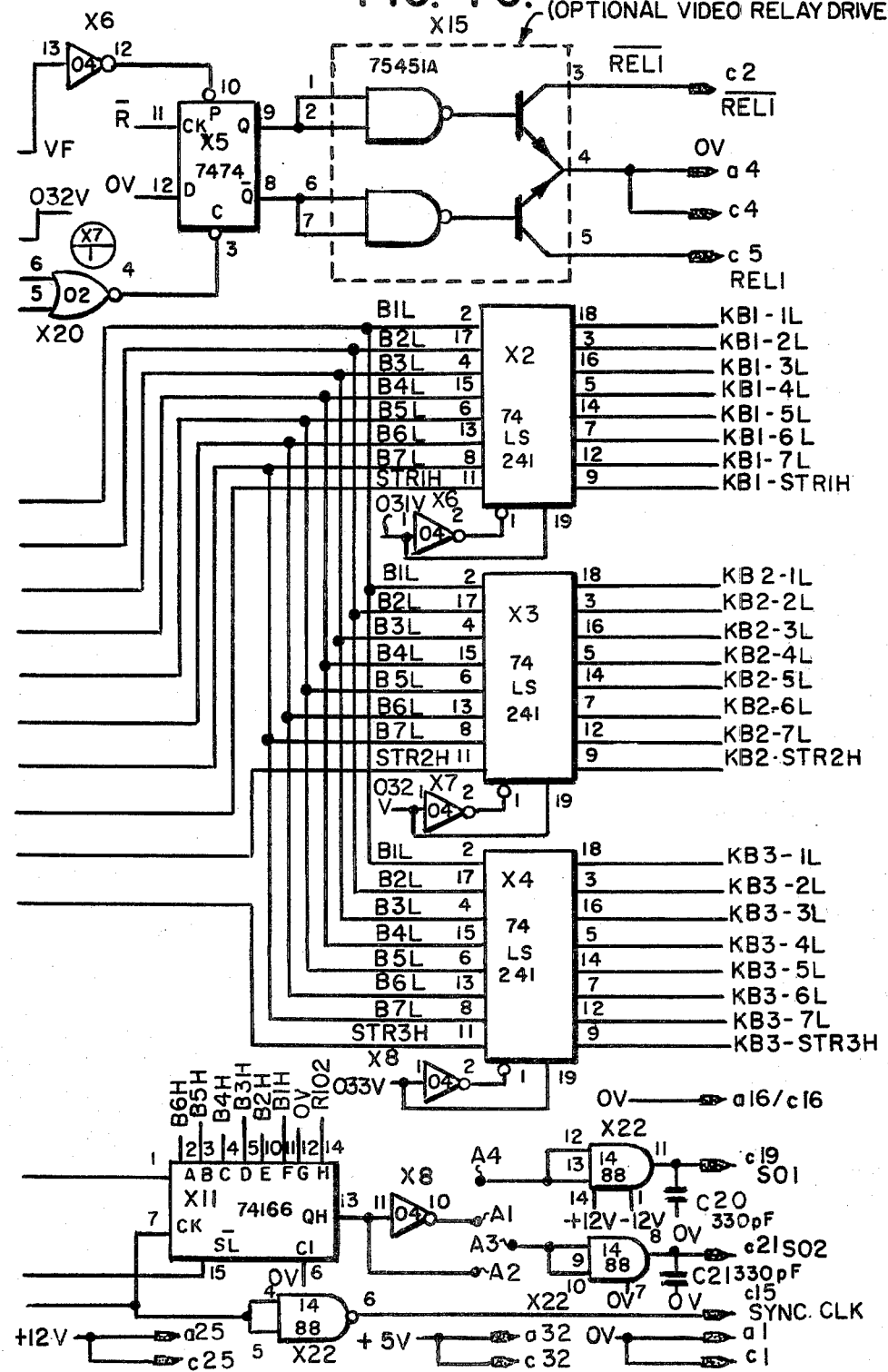
FIG. 7C. (OPTIONAL VIDEO RELAY DRIVER)

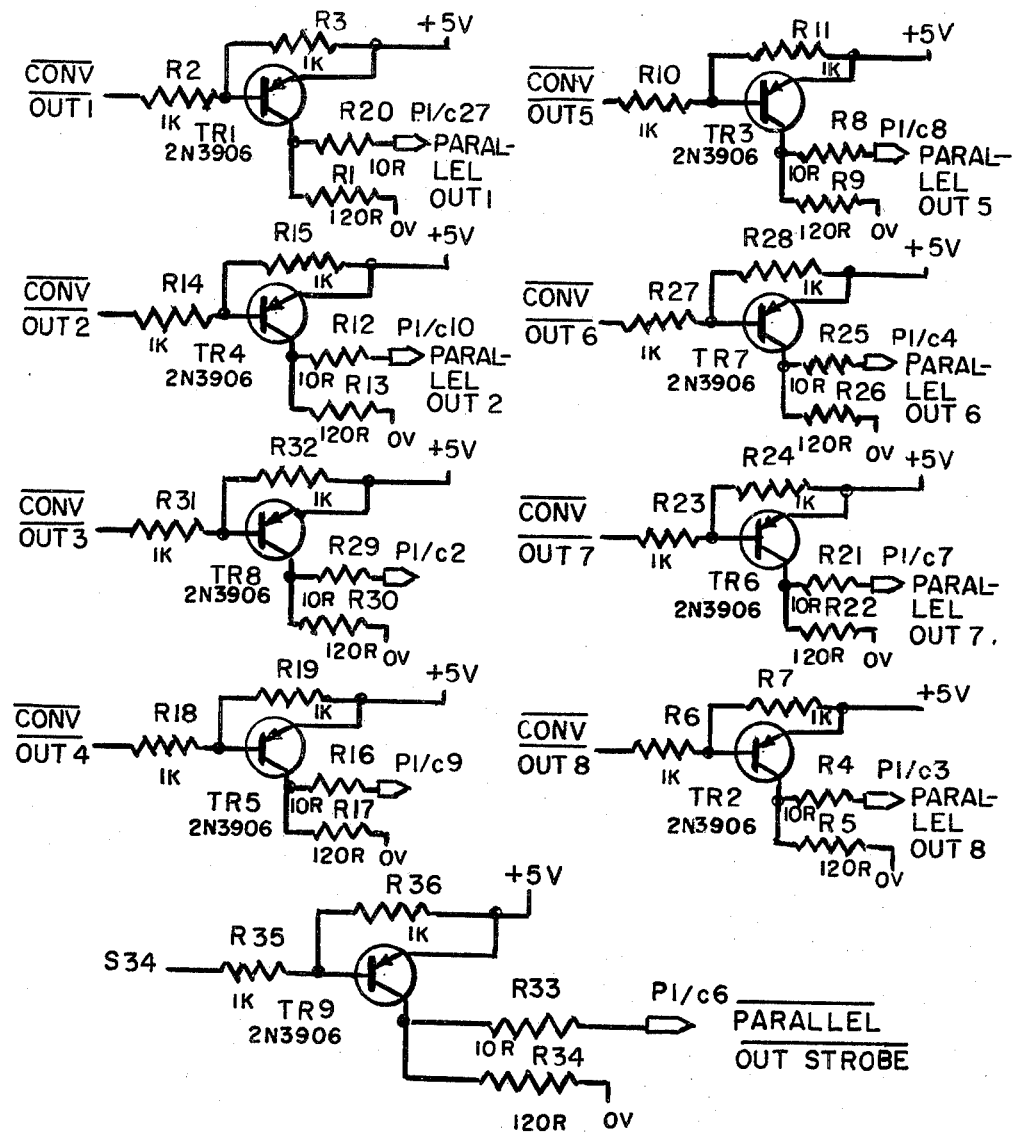
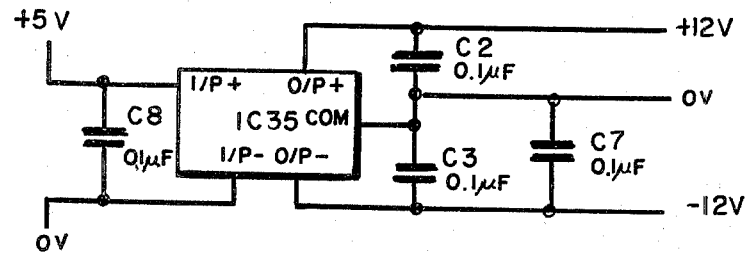
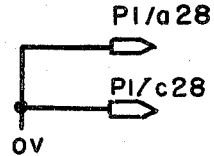
FIG. 17.

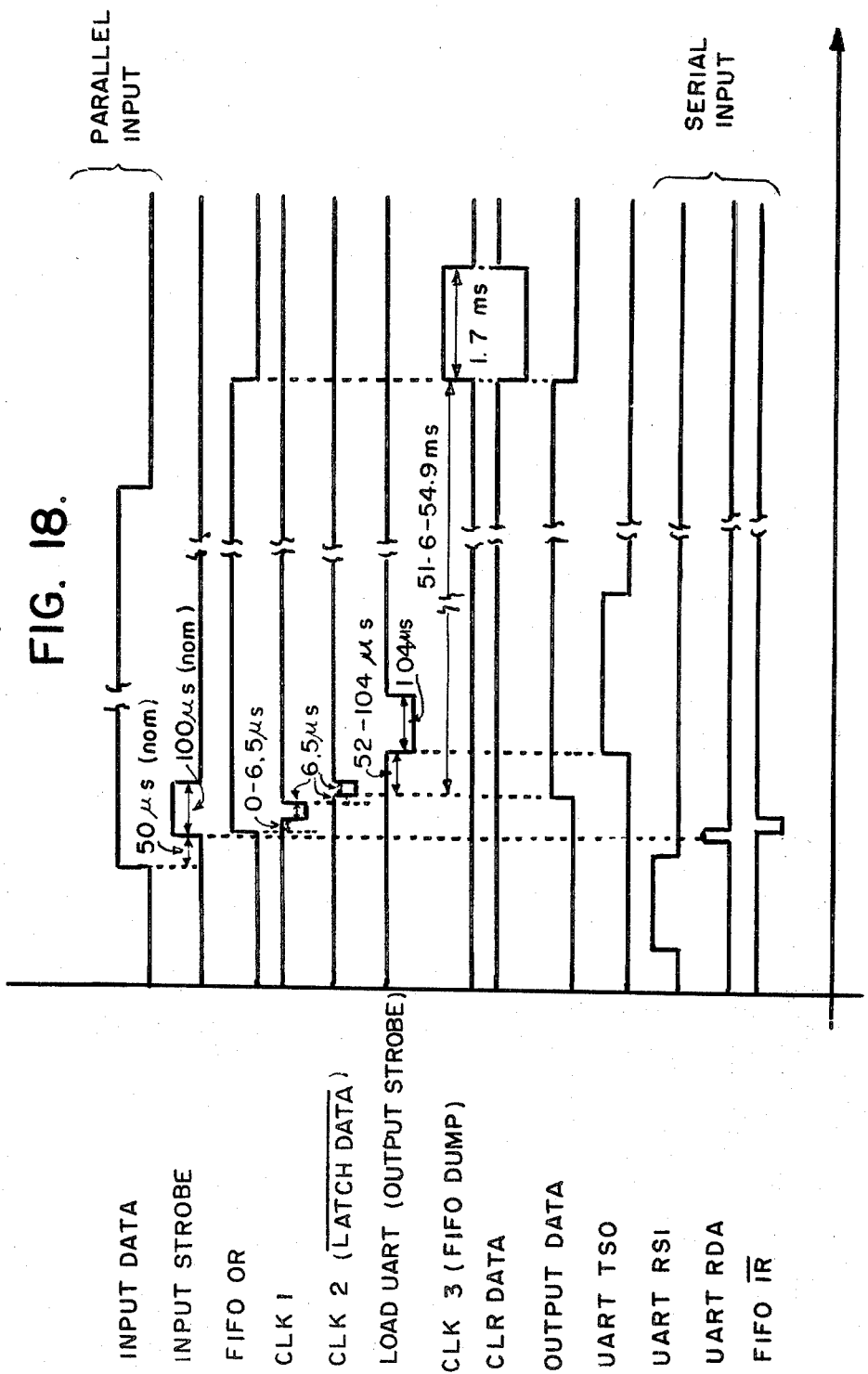

PLURAL VIDEO KEYBOARD ACCESS SYSTEM

TECHNICAL FIELD

The present invention relates to video data communications systems and particularly to such systems in which a common keyboard is used for both data communication and video display selection of simultaneously provided video input signals on one or more video display units or VDUs.

BACKGROUND ART

Keyboard access data communication systems are well known such as the REUTER MONITOR system in which a subscriber may use his keyboard to selectively access a remote computer data base for video display of textual data. In addition, elaborate prior art systems have been developed in which a user can selectively display data from different computer systems on his video display unit or VDU. Moreover, the general concept of video switching to enable common access to a plurality of simultaneously provided video signals is also known in the television art. However, applicants are not aware of any satisfactory economical prior art keyboard access data communication system in which a common keyboard may be used to both communicate with multiple computer systems and multiplex or dynamically route or select video displays on one or more VDUs from a plurality of simultaneously provided composite video signal inputs from these multiple computer systems in response to unique keyboard generated character codes. These disadvantages of the prior art are overcome by the present invention.

BRIEF DESCRIPTION OF DRAWINGS

FIG. 1 is an overall system functional block diagram of a plural video keyboard access system in accordance with the present invention;

FIG. 2 is a functional block diagram of a typical terminal controller for use in the system of FIG. 1;

FIG. 3 is a functional block diagram of a typical display driver portion of the terminal controller of FIG. 2;

FIG. 5 is a functional block diagram of the keyboard display driver portion of the system of FIG. 1;

FIGS. 7A, 7B and 7C; and 8A, 8B, and 8C comprise a schematic diagram of the keyboard display driver of FIGS. 5 and 6;

FIGS. 13A, 13B, 14A, 14B, 15, 16, and 17 comprise a schematic diagram of the keyboard code converter of FIG. 12; and FIG. 18 is a timing diagram illustrating the operation of the keyboard code converter of FIGS. 12–17.

BEST MODE FOR CARRYING OUT THE INVENTION

Figure 4:
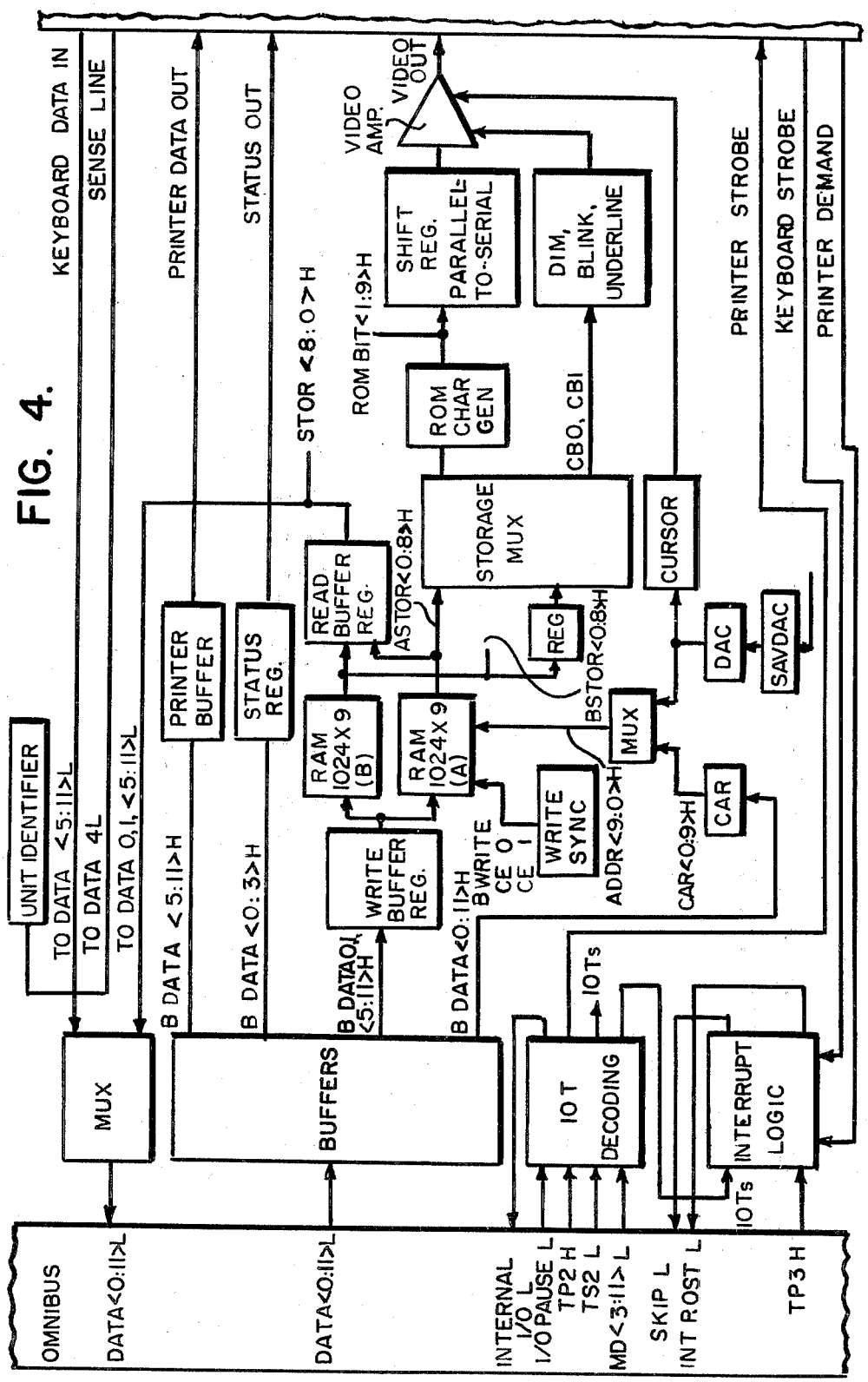
FIG. 4 is a more detailed functional block diagram of the VK8A display driver of FIG. 3.

Referring now to the drawings in detail and initially to FIG. 1, a plural video keyboard access system in accordance with the present invention, generally referred to by the reference numeral 20 is shown. The system 20 of the present invention is capable of routing a plurality of different simultaneously provided video inputs, such as up to eight inputs by way of example, to a common or single video display unit or VDU, under control of a common or single keyboard. By way of example, two possible subscriber desk station configurations 22 and 24 are shown for accomplishing the above. In the first configuration 22 a single or common VDU 26 and a single or common keyboard 28 is shown with the VDU 26 being employed to selectively display any one of the up to eight simultaneously provided video inputs under control of keyboard 28. In the second configuration 24, by way of example, four separate VDUs 30, 32, 34 and 36 are employed to enable selective simultaneous display of up to four of the up to eight simultaneously provided video inputs under control of a single or common keyboard 38, with preferably up to four different video inputs being selectively simultaneously displayed, one per VDU, on each of the four VDUs 30, 32, 34, 36. If desired, with appropriate modifications, eight VDUs could be provided to enable simultaneous display of all eight video inputs. Of course, in the instance of multiple VDUs, all of the VDUs need not provide a display, if desired, at any given time. Thus, the first configuration 22 would enable the subscriber to only view any one of the eight simultaneous video inputs at any given time under control of his common keyboard 28 while the second configuration 24 would enable the subscriber to simultaneously view any four, or all if sufficient VDUs were provided, of the eight simultaneous video inputs under control of his common keyboard 38. In either instance, the common keyboard 28 or 38 is the same keyboard used to handle conventional data communication with remote host computers (not shown) and/or with the subscriber's remote computer system 40, such as a conventional APPLE II computer system employing one or more conventional APPLE II computers capable of providing a composite video output.

Figure 6:
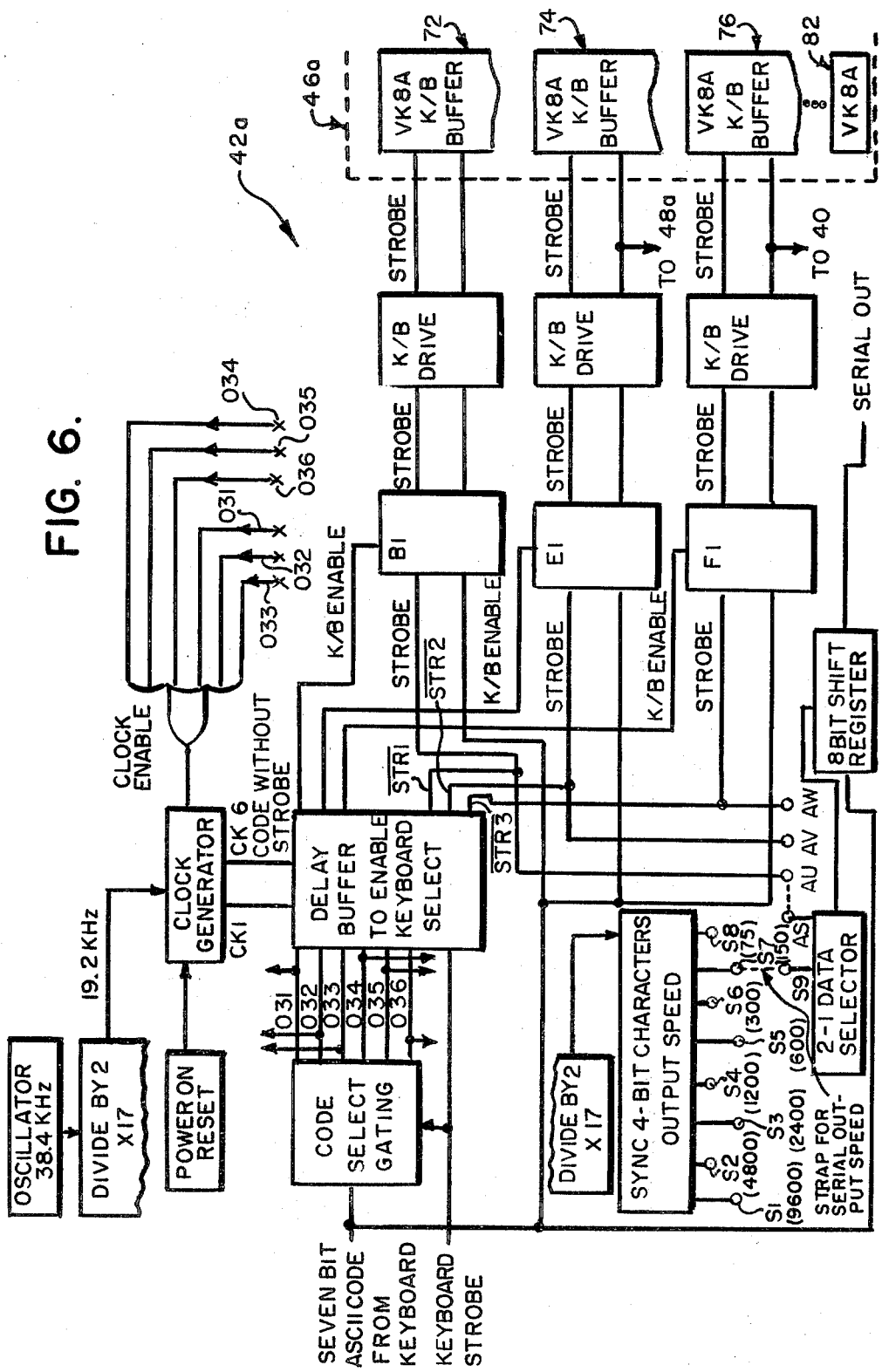
FIG. 6 is a more detailed functional block diagram of the keyboard display driver of FIG. 5.

As shown and preferred in FIG. 1, the keyboard access system 20 preferably includes a keyboard display driver network 42a, 42b associated with each of the keyboards 28 and 38, respectively, and a video matrix switch network 44a and 44b associated with each of the keyboard display drivers 42a and 42b, respectively, and with the keyboards 28 and 38, respectively. Each of the configurations 22 and 24 in the example of FIG. 1 also has an associated terminal controller 46a and 46b, respectively, shown in greater detail in FIGS. 4–6, which preferably serves as the interface between the remote host computers (not shown) and the subscriber. Preferably a conventional modem 47 is provided as part of this interface. Each of the terminal controllers 46a and 46b is preferably connected in the system 20 of FIG. 1 to provide up to six simultaneous composite video inputs to the respective video matrix switch 44a and 44b from a serial data feed from the remote host computers. The keyboard display drivers 42a and 42b are respectively also preferably connected to their associated terminal controllers 46a and 46b, and to the subscriber computer system 40, to enable the associated keyboard 28 or 38 to conventionally address the respective terminal controller 46a or 46b and/or subscriber computer system 40 and conventionally communicate with the remote host computers or subscriber computer system to retrieve and/or insert data.

The video matrix switch 44a or 44b is also preferably connected to the subscriber computer system 40 in order to enable reception of, for example, two additional locally generated composite video inputs substantially simultaneously with the video inputs from the associated terminal controller 46a or 46b, thereby providing the aforementioned eight simultaneous video inputs which can be selected via the common keyboard 28 or 38.

As further shown and preferred in FIG. 1, a keyboard code converter network 48a and 48b is connected between the respective keyboard display driver 42a and 42b and the subscriber computer system 40 where the keyboard codes associated with the subscriber computer system 40 are different from those associated with the remote host computers, assuming the keyboard codes for keyboards 28 and 38 are compatible with those of the host computers. The keyboard code converter 48a and 48b, thus converts the keyboard codes into those compatible with the subscriber computer 40. If, however, the remote host computers and the subscriber computer 40 have the same associated keyboard codes then the keyboard code converter 48a and 48b may be omitted. The keyboard code converter 48a and 48b may also serve to prevent transmission of selected characters to the subscriber computer 40.

Referring now to FIG. 2, a functional block diagram of a typical preferred terminal controller configuration, such as terminal controller 46a or 46b which acts as the communications interface between its associated keystations, via the video matrix switch 44a or 44b, and the remote host computers is shown. As shown and preferred in FIG. 2, the typical terminal controller, such as controller 46a, preferably includes a central processing unit 60, such as a Digital Equipment Corporation KK8A CPU and associated memory 62, 64 and 66. Memory 64 and 66 are preferably core, each comprising 16 K words, such as provided by a conventional Digital Equipment Corporation MM8AB Core. Memory 62 preferably includes memory extension logic, power fail logic, and ROM, with this logic circuitry being conventional such as a Digital Equipment Corporation KM8A. The control program for the terminal controller 46a is preferably a conventional data communication control program such as one employed for Reuter Monitor or the conversational program described in the commonly owned co-pending U.S. patent application entitled "Conversational Video System," filed Jan. 30, 1981 and bearing U.S. Ser. No. 230,341, the contents of which are incorporated by reference herein. As was previously mentioned, this ROM 62 is contained in a conventional KM8A module. If the control program is to be downstream loaded, then a bootstrap program is preferably stored in ROM 62. The bootstrap program would, thus, be responsible for loading the control program into core 64, 66 as well as for loading other conventional executive programs into core 64, 66 which enable the proper operation of the CPU 60.

As further shown and preferred in FIG. 2, the terminal controller 46a also preferably includes conventional cyclic redundancy check logic 68, such as a Digital Equipment Corporation KG8 and a conventional multiple serial line interface 70, such as a Digital Equipment Corporation KL8A, for interfacing the terminal controller CPU 60 with the remote host computers (not shown) via modem 47, such as at a rate of 1200 bits per second asynchronous, and, if desired, for interfacing the terminal controller CPU 60 with a local printer (not shown). In addition, the terminal controller 46a also preferably includes a display driver for each of the selectable possible six composite video outputs to the video matrix switch 44a associated with the terminal controller. Thus, since each terminal controller, by way of example, is preferably capable of providing up to 6 possible video outputs simultaneously, 6 identical display drivers 72, 74, 76, 78, 80 and 82, are provided with a particular display driver being connected to a given VDU input when that output is selected via the keyboard 28 or 38. Each of these display drivers 72 through 82 may preferably be of the type commercially available from Digital Equipment Corporation under the designation VK8A. Each display driver preferably provides video signals to the selected VDU input via the video matrix switch 44a. One of the display drivers, 72, for example, can receive input signals from the common keyboard 28 to enable the keyboard 28 to communicate with the remote host computers. If desired, this input connection can be changed to separately connect each display driver input to the remote host computers, such as at the time of initial page selection. Thus, the display driver 72 through 82, inclusive, is the interface between the CPU 60 and the individual keystation inputs.

Referring now to FIG. 3, a typical video display driver 72 is illustrated in block form. Thus, the display driver 72 preferably includes a plurality of input gates 90 for receiving the eight data lines from the keyboard 28 encoding logic, as well as for receiving a KEYBOARD PRESENT signal line also provided from the keyboard 28 logic to indicate to the terminal controller 46a, that the keyboard 28 has been switched on. In addition, the display driver 72 also includes conventional strobe logic 92 which receives a keyboard strobe signal from the keyboard 28 logic, and control, address, and data registers 94, 96 and 98, respectively. Control register 94 may provide an alarm control signal to the keyboard 28 for providing an alarm indication to the user. The address register 96 and the data register 98 are preferably associated with a display memory 100, such as a display RAM having 2048 bytes of memory. In reality, if the display screen is 80 by 24, by way of example, only the first 1920 bytes of the display RAM 100, are utilized to map 1-to-1 on to the display screen. The output of the display RAM 100 is provided to a conventional video signal generator circuit 102 which includes a character generator for providing a video display signal to one of the video matrix switch 44a inputs from the contents of the display RAM 100. As shown and preferred in FIG. 3, the input gates 90, strobe logic 92, control register 94 and address and data registers 96 and 98, respectively, are all connected to the CPU bus 104, such as a conventional PDP8 Omnibus. As was previously mentioned, the typical display driver 72 is preferably a conventional display driver such as a VK8A commercially available from Digital Equipment Corporation and a more detailed block diagram of such a VK8A display driver is illustrated in FIG. 4 and corresponds to FIG. 3-1 in the VK8A Maintenance Manual of January 1977 which may be referred to for further details on the operation of the VK8A display driver.

Referring now to FIGS. 5-8, a typical keyboard display driver network 42a in accordance with the present invention shall now be described in greater detail. The keyboard display driver 42a preferably provides dynamic keyboard routing and can provide limited video switching for two video inputs. However, the video matrix switch 44a preferably employed in conjunction with the keyboard display driver 42a overcomes these switching limitations by enabling up to eight video inputs, by way of example, to be routed to the VDU inputs. The keyboard display driver 42a preferably performs these functions upon reception of unique characters which are generated by the user, from the common keyboard 28. The keyboard display driver 42a preferably provides for a single common keyboard 28 input, which may then be routed to three selectable parallel outputs, one or all of which may be connected to a dual serial output. In the system 20 of FIG. 1, one of these parallel outputs is routed to display driver or keyboard buffer 72 in the terminal controller 46a while the other two parallel outputs are routed to the keyboard code converter 48a, assuming one is employed, and to the subscriber computer system 40. The data input format is preferably 7 bit modified ASC11 with strobe as is the parallel data output format. The serial data output format is preferably 7 bit modified ASC11 with a start and stop bit, providing 10 bits per character, transmitted at a data speed, by way of example, of 75-9600 bps. The keyboard display driver 42a is preferably hard-wire programmable by hardware links to act upon up to 128, 7 bit characters and recognise, for example, four of these characters which have been preselected and which correspond to the three parallel outputs as well as an inert condition when the video matrix switch 44a is in operation. Upon reception of the predetermined characters the source keyboard 28 data lines will be routed to any combination of the three parallel keyboard outputs or to the video matrix switch 44a. The third keyboard output is usually permanently connected to a dual serial output which can operate from 75 to 9600 BPS. In the system 20 of FIG. 1, the keyboard display driver 42a need only detect up to 4 unique character codes. The keyboard display driver 42a is preferably hard-wire programmed to recognise these assigned codes. Two connections are preferably required for each character detection. Three pairs of programming points are assigned for keyboard routing, which are: AG AH=KB1 output, AI AJ=KB2 output, and AK AL=KB3 output. The following list of codes are assigned to the respective programming points, any pair may be linked to AG AH, AI AJ, AK AL, AM AN, for the purpose of keyboard switching.

| ASC11 CODE | HARD-WIRE PROGRAMMING POINTS | | |
|---|---|---|---|
| 0 | A | and | Q |
| 1 | B | and | Q |
| 2 | C | and | Q |
| 3 | D | and | Q |
| 4 | E | and | Q |
| 5 | F | and | Q |
| 6 | G | and | Q |
| 7 | H | and | Q |
| 10 | I | and | Q |
| 11 | J | and | Q |
| 12 | K | and | Q |
| 13 | L | and | Q |
| 14 | M | and | Q |
| 15 | N | and | Q |
| 16 | O | and | Q |
| 17 | P | and | Q |
| 20 | A | and | R |

-continued

| ASC11 CODE | HARD-WIRE PROGRAMMING POINTS | | |
|---|---|---|---|
| 21 | B | and | R |
| 22 | C | and | R |
| 23 | D | and | R |
| 24 | E | and | R |
| 25 | F | and | R |
| 26 | G | and | R |
| 27 | H | and | R |
| 30 | I | and | R |
| 31 | J | and | R |
| 32 | K | and | R |
| 33 | L | and | R |
| 34 | M | and | R |
| 35 | N | and | R |
| 36 | O | and | R |
| 37 | P | and | R |
| 40 | A | and | S |
| 41 | B | and | S |
| 42 | C | and | S |
| 43 | D | and | S |
| 44 | E | and | S |
| 45 | F | and | S |
| 46 | G | and | S |
| 47 | H | and | S |
| 50 | I | and | S |
| 51 | J | and | S |
| 52 | K | and | S |
| 53 | L | and | S |
| 54 | M | and | S |
| 55 | N | and | S |
| 56 | O | and | S |
| 57 | P | and | S |
| 60 | A | and | T |
| 61 | B | and | T |
| 62 | C | and | T |
| 63 | D | and | T |
| 64 | E | and | T |
| 65 | F | and | T |
| 66 | G | and | T |
| 67 | H | and | T |
| 70 | I | and | T |
| 71 | J | and | T |
| 72 | K | and | T |
| 73 | L | and | T |
| 74 | M | and | T |
| 75 | N | and | T |
| 76 | O | and | T |
| 77 | P | and | T |
| 100 | A | and | U |
| 101 | B | and | U |
| 102 | C | and | U |
| 103 | D | and | U |
| 104 | E | and | U |
| 105 | F | and | U |
| 106 | G | and | U |
| 107 | H | and | U |
| 110 | I | and | U |
| 111 | J | and | U |
| 112 | K | and | U |
| 113 | L | and | U |
| 114 | M | and | U |
| 115 | N | and | U |
| 116 | O | and | U |
| 117 | P | and | U |
| 120 | A | and | V |
| 121 | B | and | V |
| 122 | C | and | V |
| 123 | D | and | V |
| 124 | E | and | V |
| 125 | F | and | V |
| 126 | G | and | V |
| 127 | H | and | V |
| 130 | I | and | V |
| 131 | J | and | V |
| 132 | K | and | V |
| 133 | L | and | V |
| 134 | M | and | V |
| 135 | N | and | V |
| 136 | O | and | V |
| 137 | P | and | V |
| 140 | A | and | W |

-continued

| ASC11 CODE | HARD-WIRE PROGRAMMING POINTS | | |
|---|---|---|---|
| 141 | B | and | W |
| 142 | C | and | W |
| 143 | D | and | W |
| 144 | E | and | W |
| 145 | F | and | W |
| 146 | G | and | W |
| 147 | H | and | W |
| 150 | I | and | W |
| 151 | J | and | W |
| 152 | K | and | W |
| 153 | L | and | W |
| 154 | M | and | W |
| 155 | N | and | W |
| 156 | O | and | W |
| 157 | P | and | W |
| 160 | A | and | X |
| 161 | B | and | X |
| 162 | C | and | X |
| 163 | D | and | X |
| 164 | E | and | X |
| 165 | F | and | X |
| 166 | G | and | X |
| 167 | H | and | X |
| 170 | I | and | X |
| 171 | J | and | X |
| 172 | K | and | X |
| 173 | L | and | X |
| 174 | M | and | X |
| 175 | N | and | X |
| 176 | O | and | X |
| 177 | P | and | X |

Figure 7A:
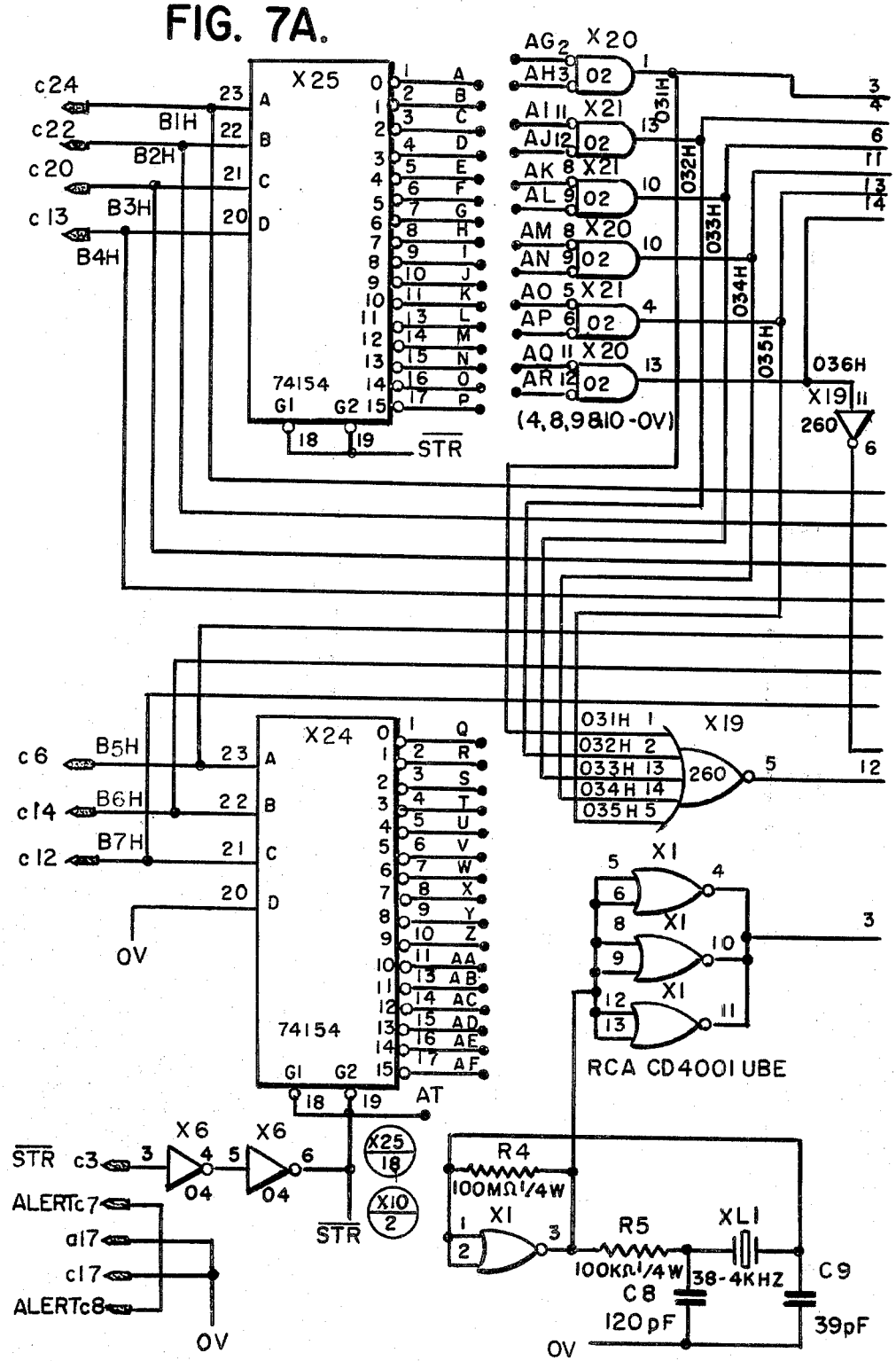
Figure 7B:
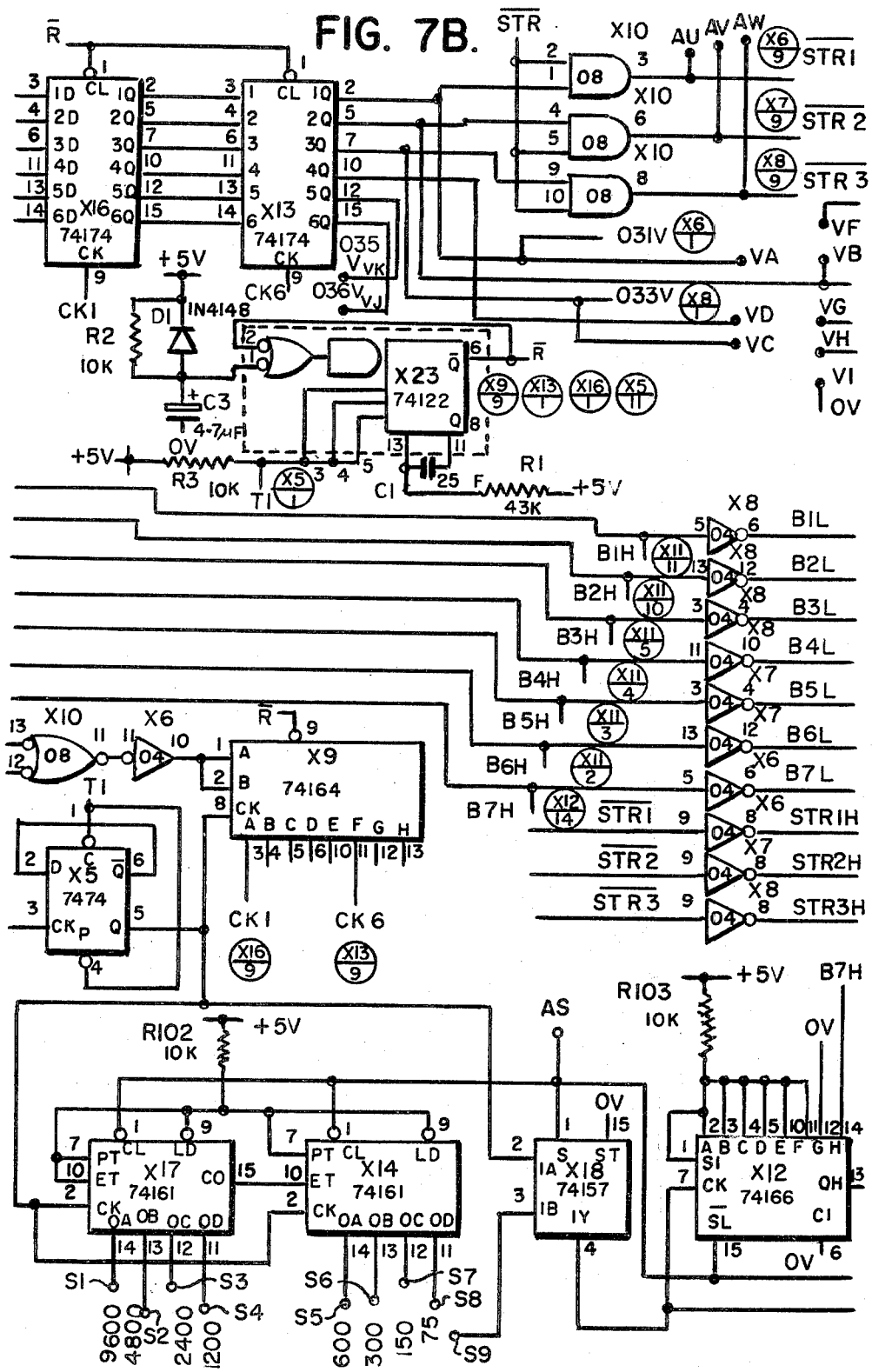
Figure 8A:
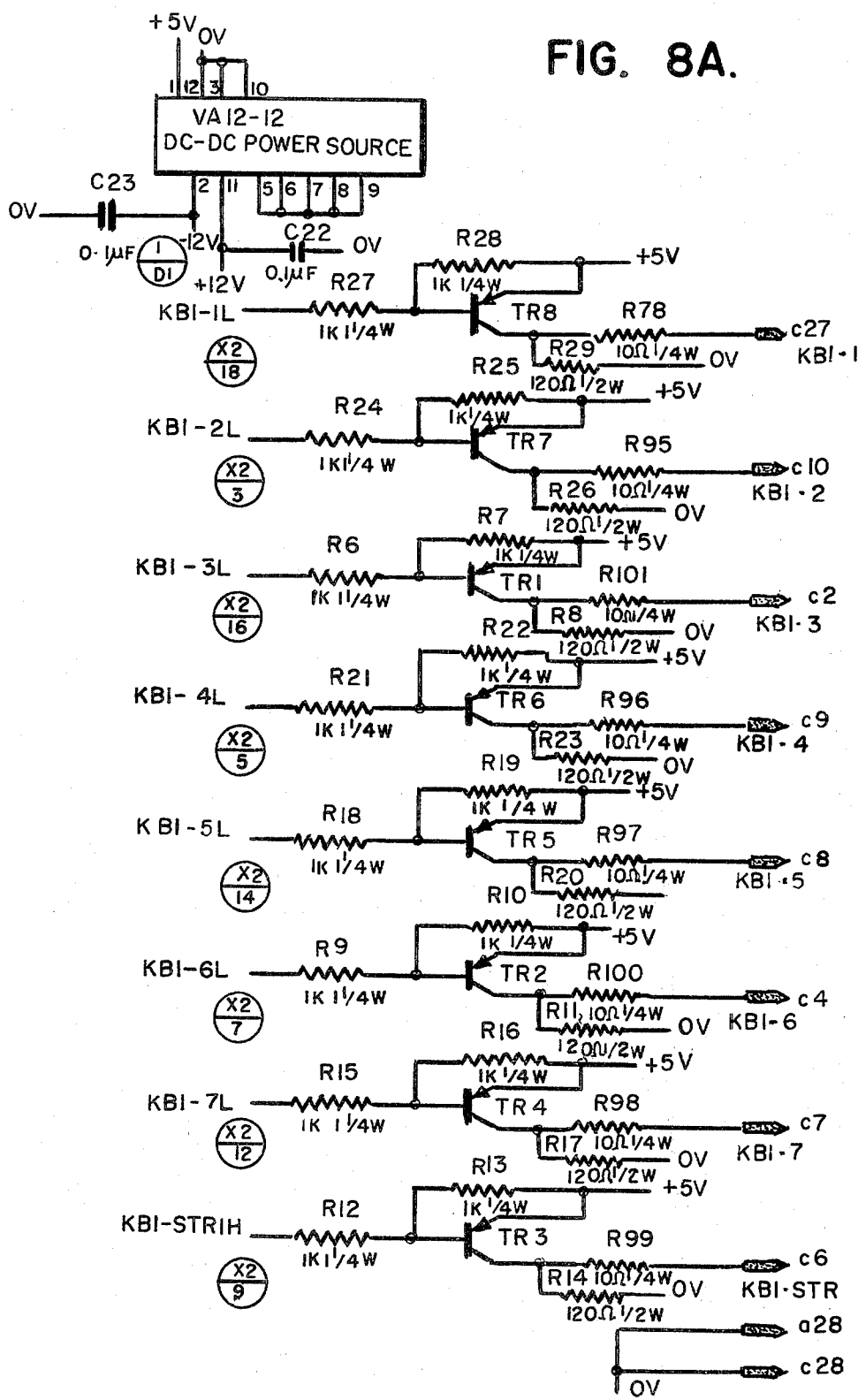
Figure 8B:
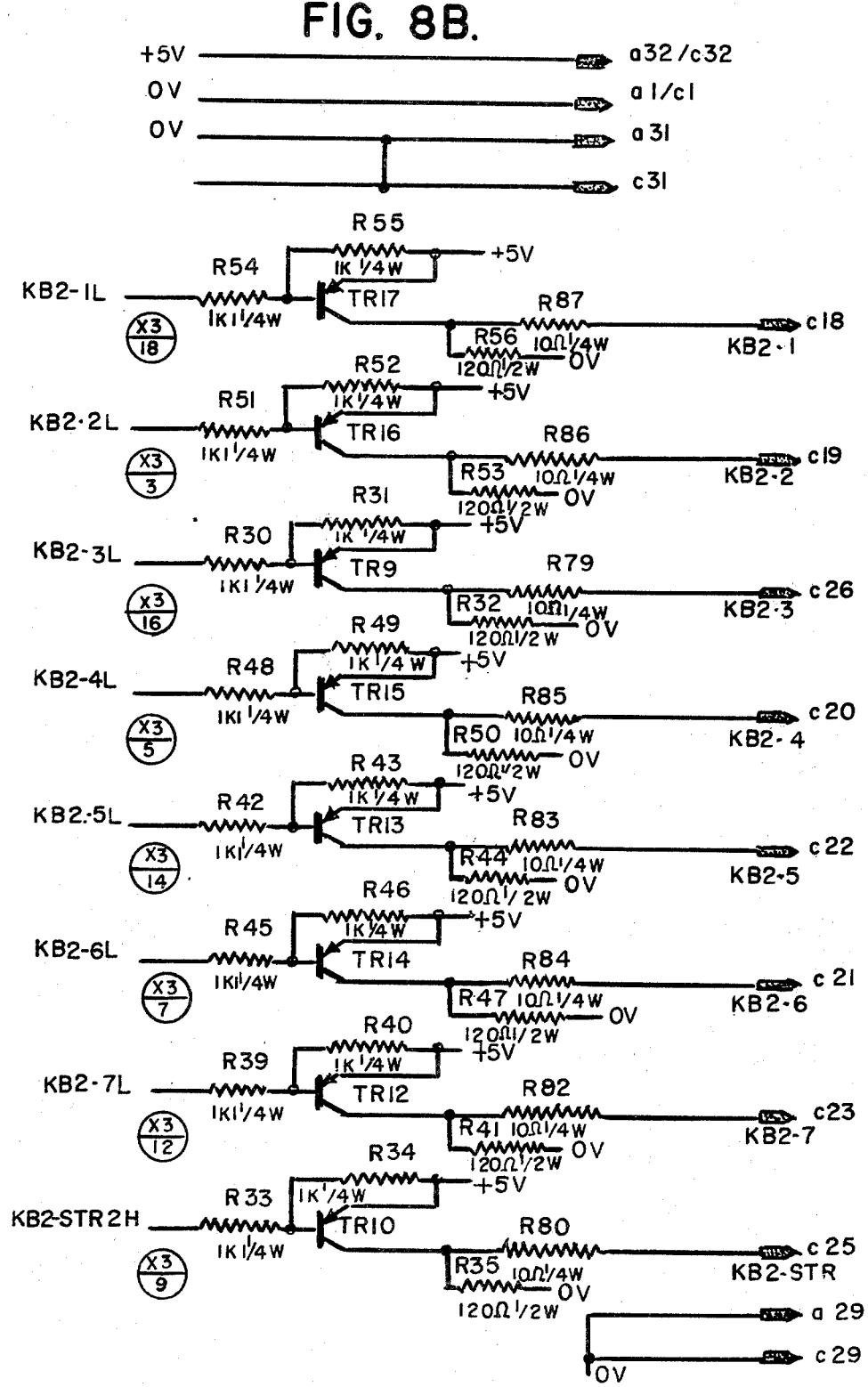
Figure 8C:
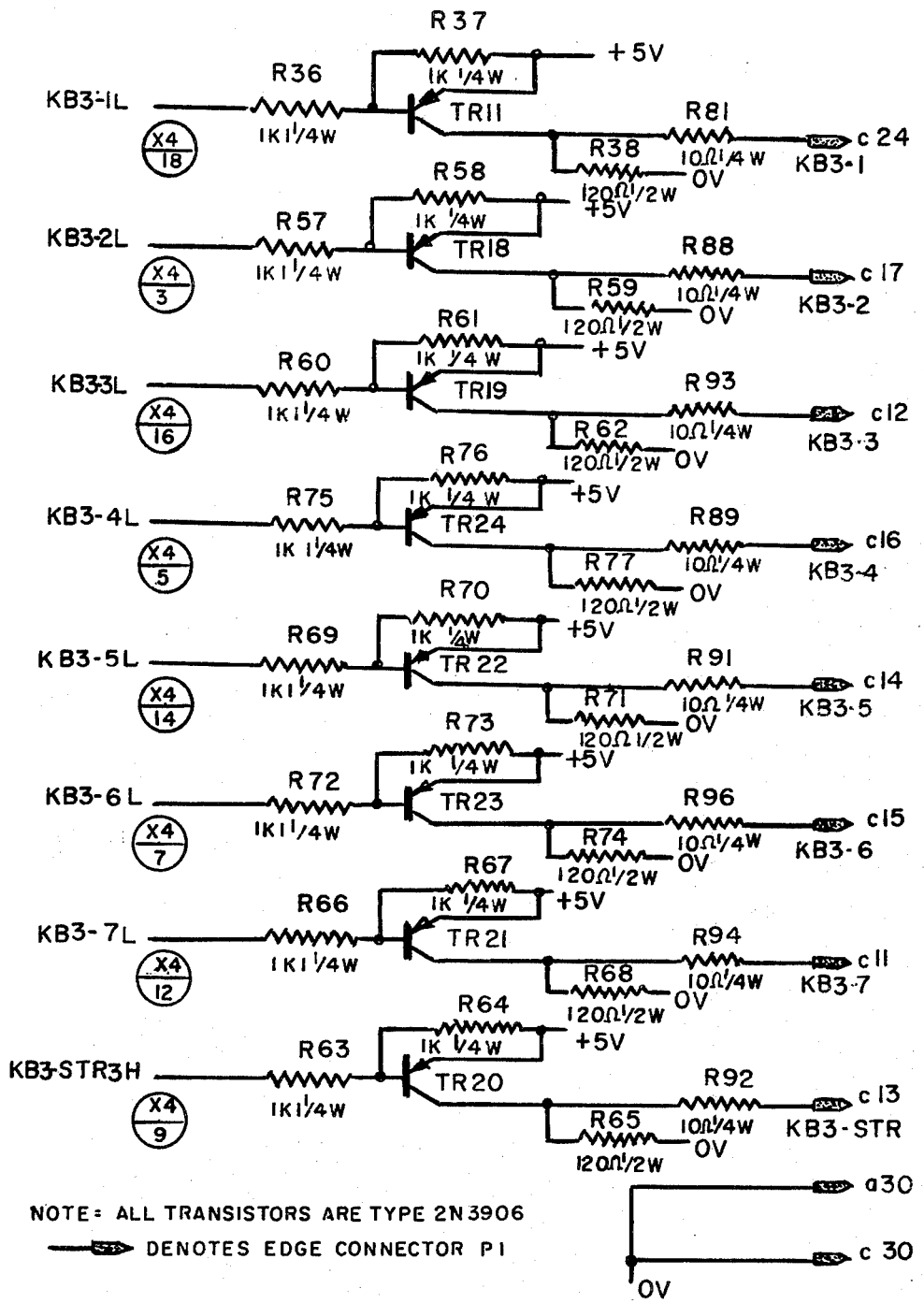

Referring now to FIGS. 7 and 8, the seven-bit ASC11 keyboard code is preferably fed to a pair of 4-to-16 line decoders X24 and X25 whose outputs may be selected to produce up to six unique characters by links to the inputs of X20 and X21 although as previously described only four such characters are needed in the system 20 of FIG. 1. On detection of any code the input to X9 which is an 8-bit shift register is gated and, on the next 19.2 kHz clock CK1, is produced at the 'A' output of register X9. Signal CK1 clocks flip-flop X6 and the decoded character is clocked into the relevant flip-flop of the Hex quadruple flip-flop element X6. Preferably, by way of example, after 250 microseconds (5×19.2 kHz pulses), CK6 is produced at the 'F' parallel output of register X9, and flip-flop X13 is clocked. At this time the strobe pulse which would be generated by the keyboard 28 when the keys were activated, is no longer present. Therefore data will not be presented to the output lines. When flip-flop X13 is clocked, the selected code appears at the output and is fed to the hard-wire programming points. The strobe gating is preferably not enabled at this time as the strobe time has elapsed. The hard-wire program points are preferably strapped to three keyboard buffer line units X2, X3, X4 and as each keyboard buffer unit responds to the unique code, the input to and out from the respective buffer is enabled. Once the code is detected and the relevant buffer X2, X3 or X4 enabled, successive data keying is fed via the inverter stages X8, X7, X6 to the input of the buffer. The strobe lines are not preferably gated through X10 as each character is keyed and fed via inerters X6, X7 and X8 to the strobe input of the buffer keyboard drivers X2, X3 and X4. The output from the keyboard buffer X2, X3 or X4 is fed via a driver stage (FIG. 8) before being fed to the keyboard buffer input of the relevant VK8A 72 on the terminal controller 46a, or compatible type interface.

Serial output of keyboard data may be enabled by linking hard-wire program point AS to any of the following hard-wire program points: AT, AU, AV or AW. When every character is required to be transmitted, AT is linked to AS thus ensuring every strobe generated initiates the serial output sequence. With AS linked to AU, AV, or AW only the selected character will initiate the output sequence. In such an instance, the output sequence is preferably begun by the low excursion of the strobe, clearing the speed select 4-bit counters X14 and X16 and at the same time enabling the Shift/Load input to the 8-bit shift registers X11 and X12. The low select at pin 1 of selector X18 also enables the 19.2 kHz to clock the keyboard data via the 1A input of selector X18 into registers X11 and X12. When the pulse ends (for example, after 70-100 microseconds) the high select level at pin 1 of selector X18 enables the 1B input of selector X18. Selected output speeds available at S1 to S8 are preferably fed via S9 and selector X18 to provide the output data and SYNC clock rate. The output data is preferably at EIA level and can be inverted before feeding the subscriber computer system 40. When power is initially applied the dc triggered multi-vibrator X23 produced a low reset pulse R. The low excursion of the pulse clears X6 and X13 ensuring there is no select code present.

The balance of the circuitry of the keyboard display driver 42a will be readily understood by one of ordinary skill in the art by reference to FIGS. 5-8 and will not be described in greater detail hereinafter.

Figure 9:
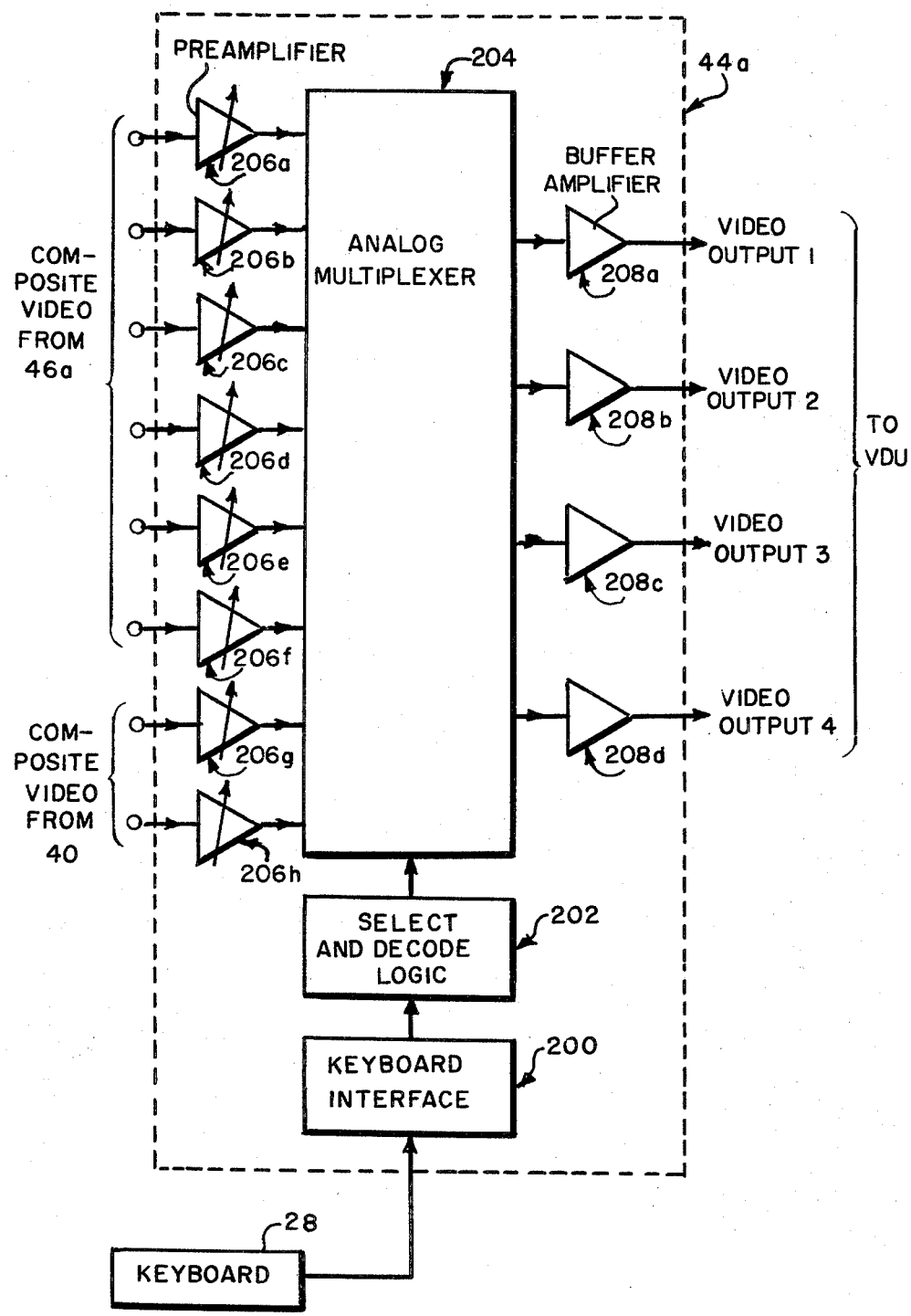
FIG. 9 is a functional block diagram of the video matrix switch portion of the system of FIG. 1.
Figure 10A:
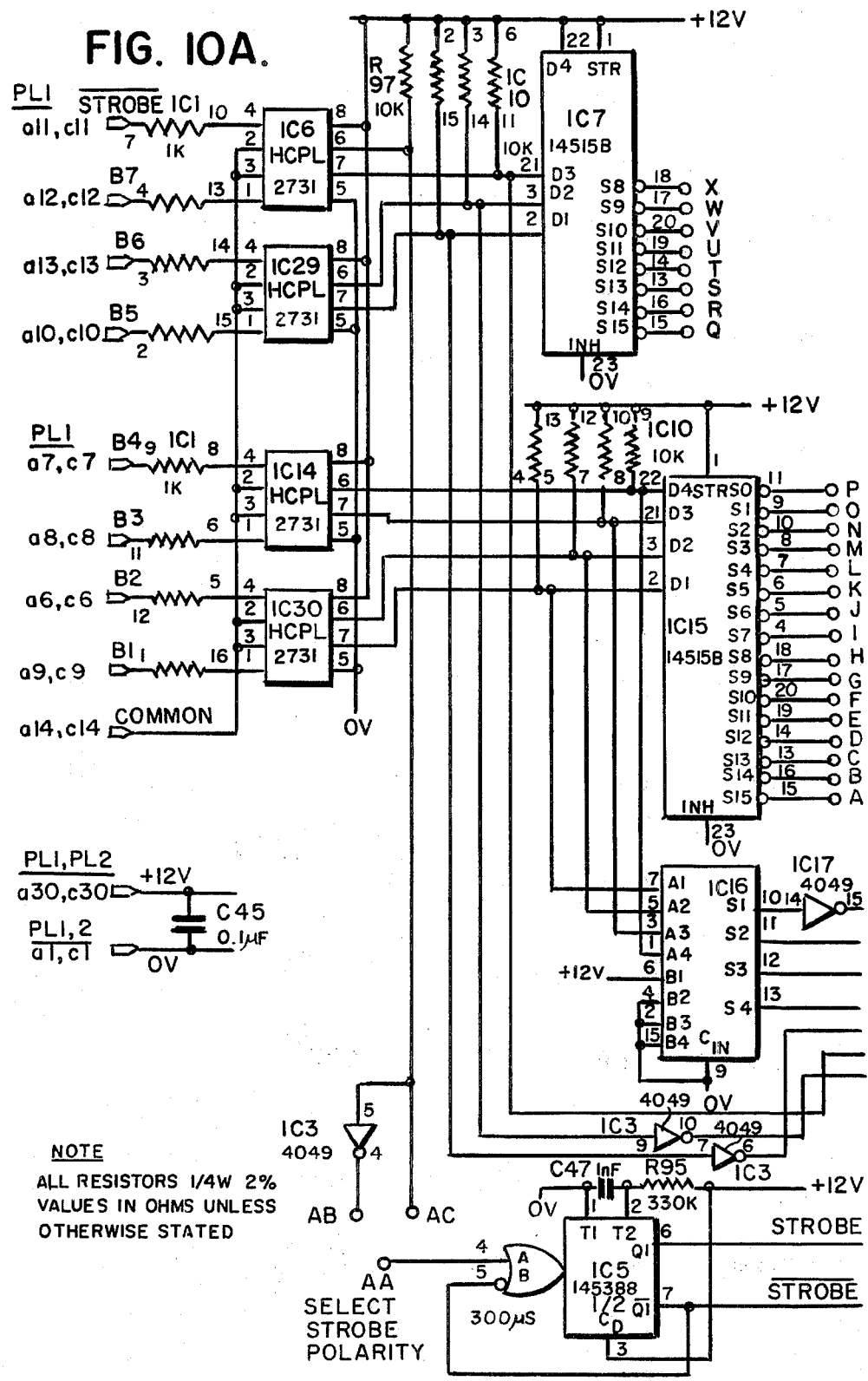
FIGS. 10A, 10B and 10C; and 11A and 11B comprise a schematic diagram of the video matrix switch of FIG. 9.
Figure 10B:
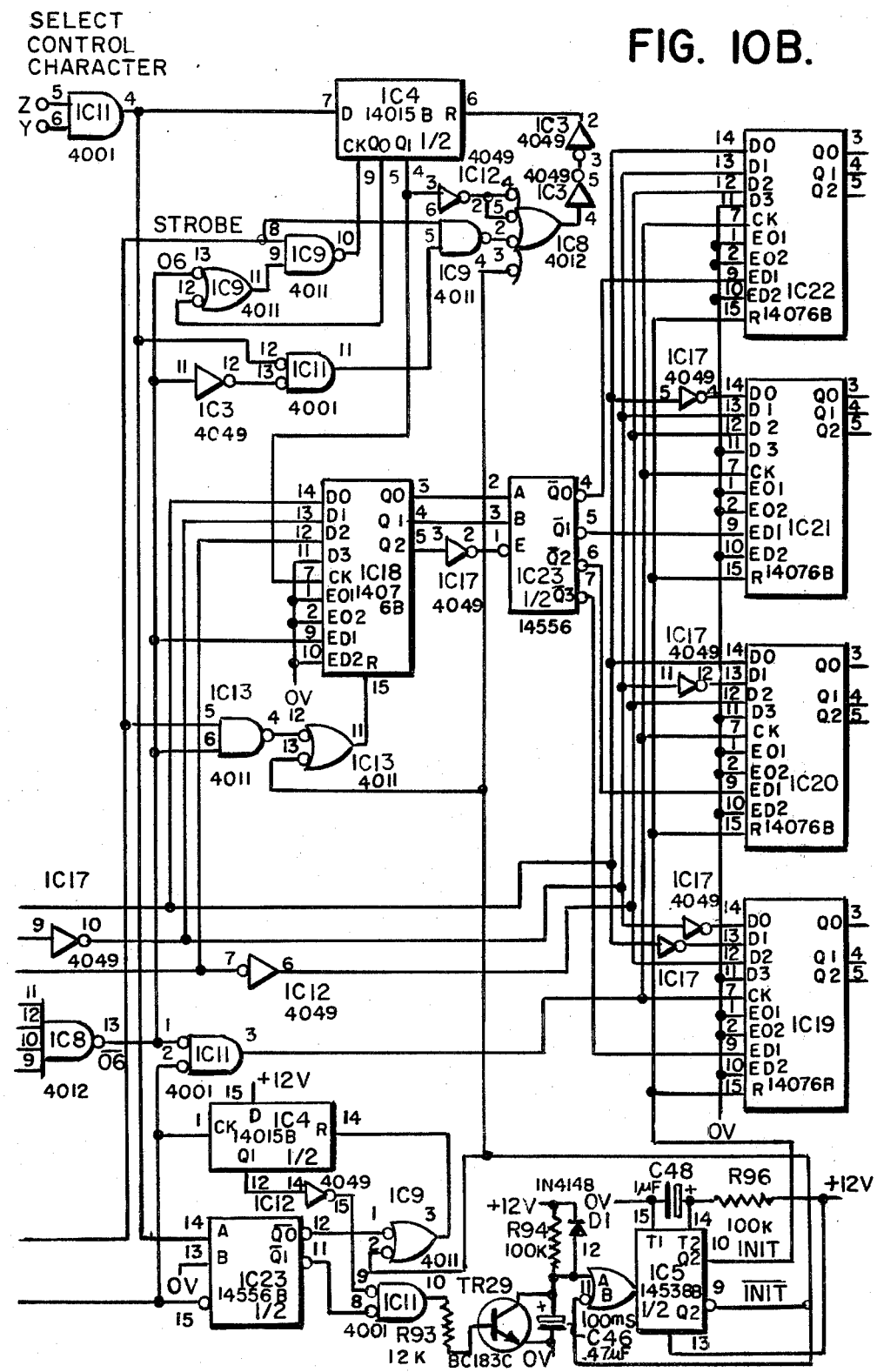
Figure 10C:
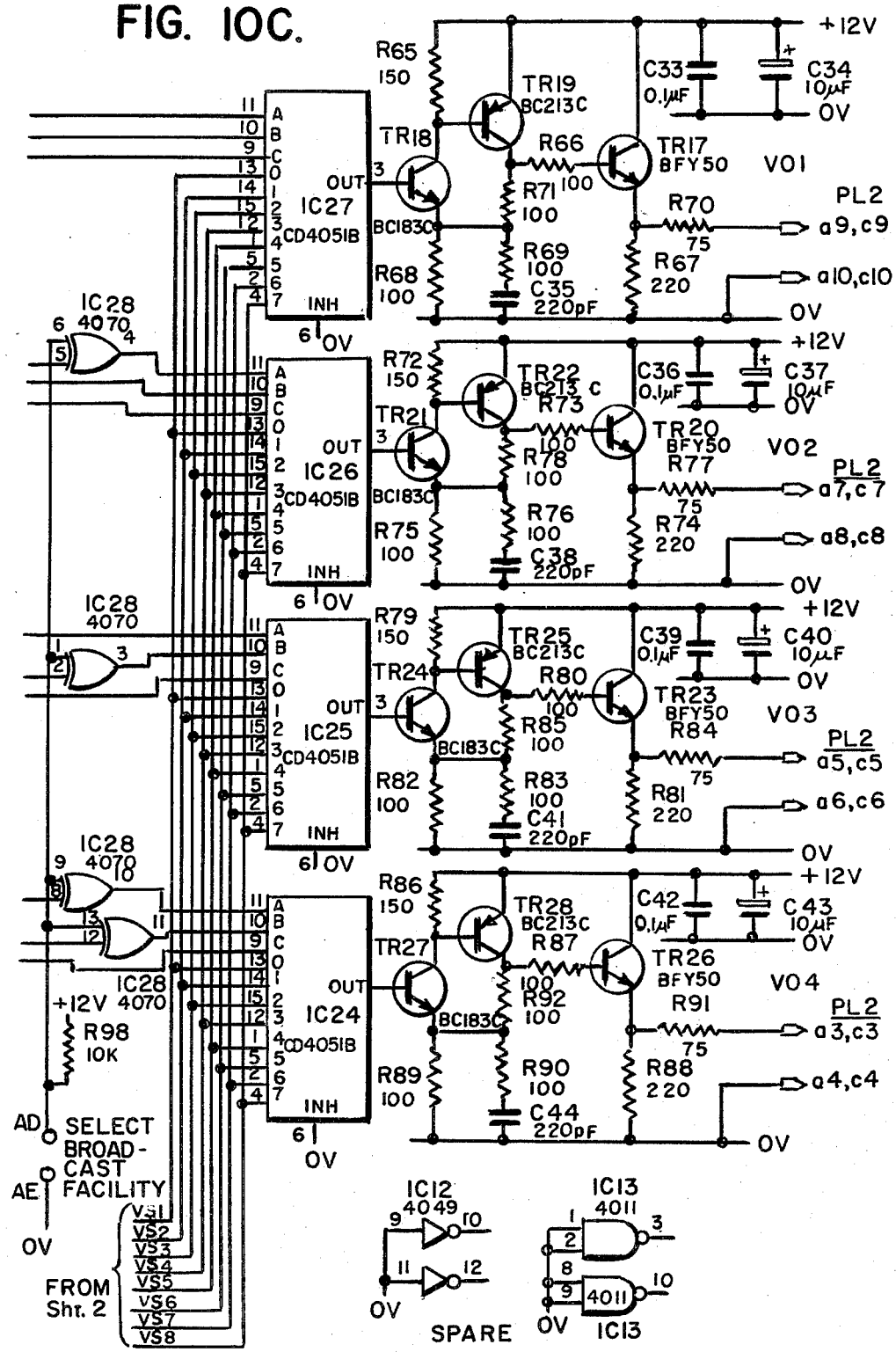
Figure 11A:
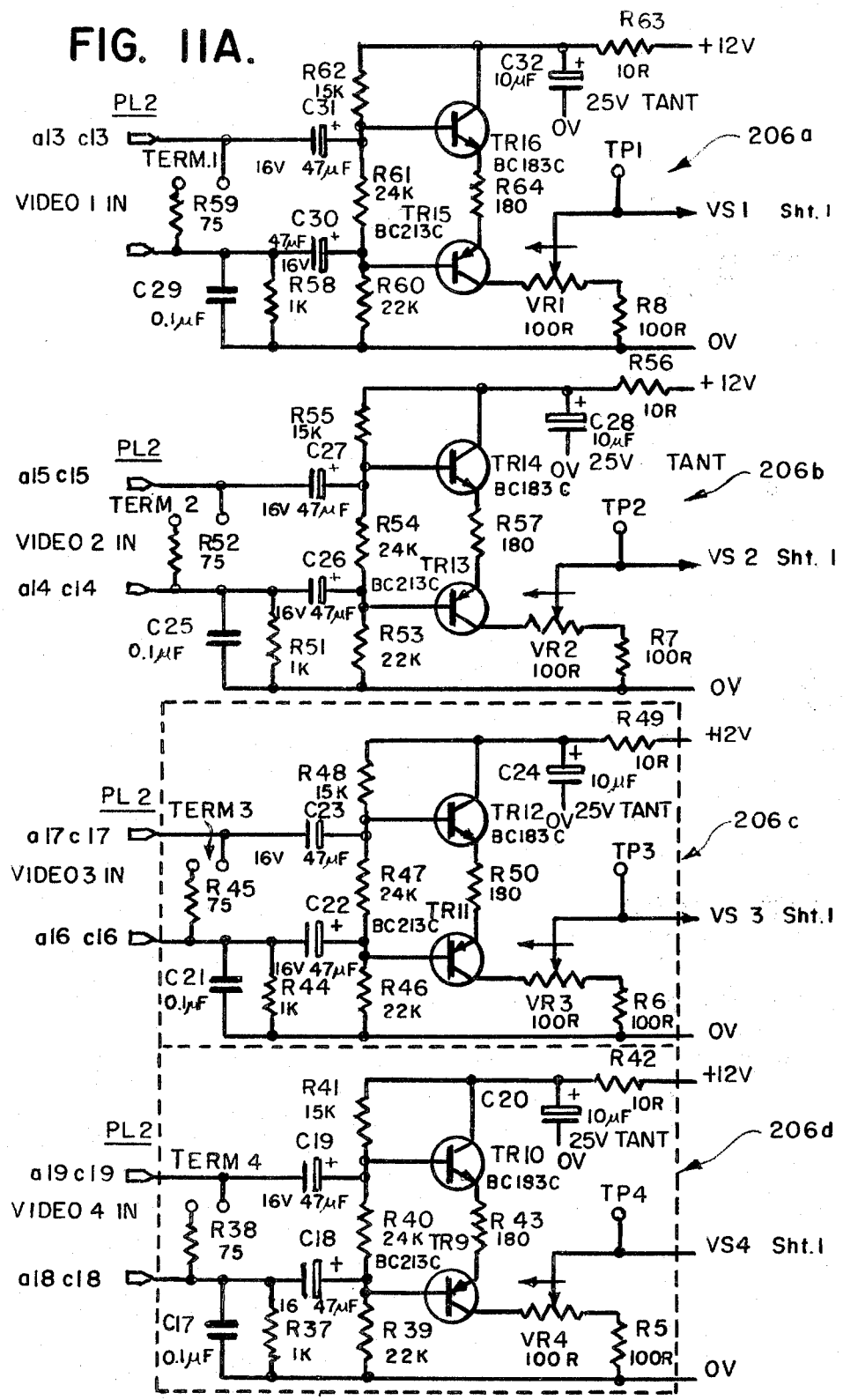
Figure 11B:
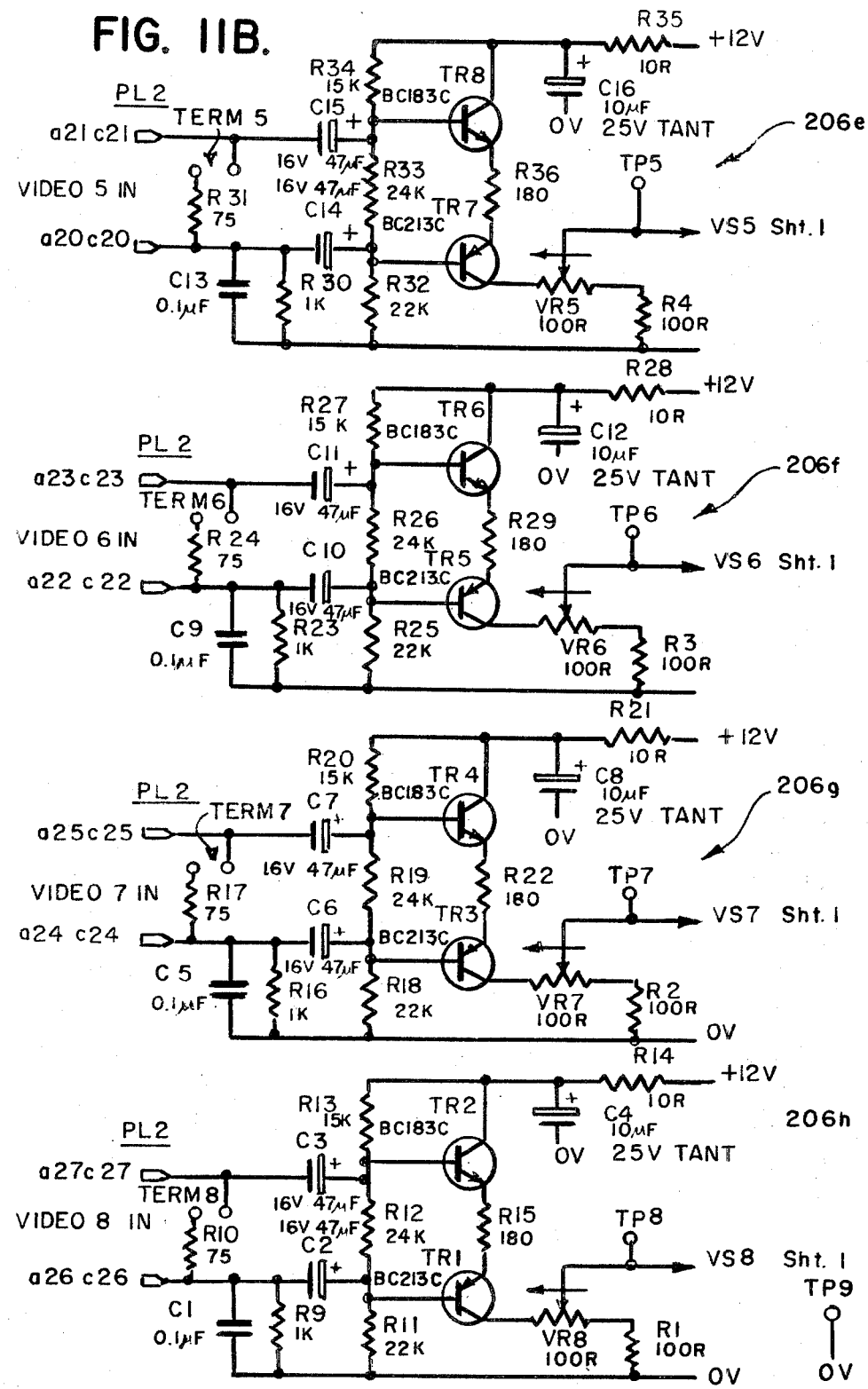

Referring now to FIGS. 9-11, a typical preferred video matrix switch 44a in accordance with the present invention is shown in greater detail. As shown and preferred in FIG. 9, the video matrix switch 44a includes a keyboard interface 200 connected to the keyboard 28 which acts as a local converter, select and decode logic 202 which decodes the incoming characters to detect the unique character to initiate the video switching sequence, as well as to detect the numeric characters in the range 1 to 8 associated with the eight video inputs, and an analog multiplexer 204 which routes the various video inputs to the proper output lines in accordance with the selection signals. The various video inputs is each preferably connected to the multiplexer 204 via a conventional pre-amplifier 206a-206h, respectively, and each of the four video outputs from the multiplexer 204 is preferably provided to the appropriate VDU input via a conventional buffer amplifier 208a-208d, respectively.

Thus, the video matrix switch 44a provides for up to 8 unique composite video inputs which may be connected to any of the 4 outputs, each of which can provide a video input to a VDU, such as VDU's 30-36. The video switching is performed on receipt of unique character sequence generated by the user from the common keyboard 28 which is also used to communicate with either the remote host computers or the subscriber computer system 40, as previously described. In order to enable such communication with these computers, the video matrix switch 44a is used in conjunction with the keyboard display driver 42a.

The input specifications for the video matrix switch 44a, by way of example are as follows: a 7-bit modified ASCII data format with strobe (no parity bit), parallel data transfer and TTL compatible data levels. The video inputs should preferably all be at the same line and frame rate. Preferably all input video signals must be identical in horizontal and vertical frequencies to ensure that the VDU will remain locked when switching between sources. By way of example, the input level is nominally 1 V peak-to-peak composite, with adjustment being provided to cater for signals between 0.8 V and 1.5 V without affecting display intensity. With respect to the output specifications the same requirements apply to the video output as to the input.

Like the keyboard display driver 42a, the video matrix switch 44a is preferably hard-wire programmable using hardware links to act upon to 128 7-bit characters. When a predetermined character has been received the video matrix switch 44a will be enabled to accept further numeric characters. The first numeric, in the range 1-4, preferably selects the one of four screens or video outputs to be acted upon. The second numeric, in the range 1-8, preferably selects a video input and routes it to the chosen screen or video output. Once the screen or output line has been selected, further numeric keys in the range 1-8 may be pressed to select other video inputs for that same screen. This facility continues to be available until any key other than 1-8 is pressed at which time the video matrix switch 44a becomes disabled until the enabling character is again received. If desired, by way of example, pressing the enabling character key three times in succession can cause the 'default mode' to be displayed, ie screen 1 displays video input 1, screen 2 displays video input 3, etc. Preferably, on power up, the VDU displays will be in the 'default mode' and the keyboard 28 will have no effect until the enabling character is pressed.

The video matrix switch 44a can be programmed such that any character may be decoded to form the enabling or control character. As previously described, the purpose of the control character is to initiate a video switch sequence, abort an incorrect sequence, or bring up the default mode. The character code required may be determined as shown in the above Table also associated with the keyboard display driver 46a. The control character, once selected, may be hard-wire programmed by linking from the output of the decoders IC7 and IC15 to program points Y and Z, as shown in FIG. 11. The incoming strobe pulse can be inverted by connecting program point AA to either AB or AC. For a negative going strobe from the keyboard 28, AA is linked to AB and for a positive going strobe, AA is linked to AC. As shown and preferred in FIGS. 9-11, a potentiometer VR1-VR8 is provided on each input amplifier 206a-206h to preferably enable all 8 video levels to be adjusted to a common standard. The control character used to initiate the video matrix 44a sequence is also programmed on the keyboard display driver 42a to inhibit all outputs and the video matrix switch 44a will preferably be automatically inhibited on receipt of keyboard display driver 42a control characters.

Referring now to FIGS. 10-11, the video matrix switch 44a preferably uses four optical isolators IC6, IC14, IC29 and IC30, such as type HCPL2731. The seven-bit ASCII code from the keyboard 28 drives the quad optical isolators IC6, IC14, IC29 and IC30 which provide level conversion from TTL signals to the 12 V swing required, as well as giving electrical isolation from the rest of the circuit. The opto-isolators IC6, IC14, IC29 and IC30 invert the ASCII code and the output is fed to a pair of preferably 4-to-16 line decoders IC7 and IC15 whose outputs are preferably selected to detect a unique character by hard-wire to pins 5 and 6 of gate IC11. Any character in the ASCII set may be chosen to form the unique control character, which is used to initiate the switching sequence. Pressing the control character key causes a high to be entered at the D input (pin 7) of the 4-bit shift register IC4. The keyboard STROBE pulse, which is preferably debounced to ensure a single 300 us pulse in monostable IC5 (pin 4), clocks IC4 so a high appears at the Q∅ output (pin 5). Pin 12 of gate IC9 is now high and further STROBE pulses are inhibited unless signal $\overline{06}$ is low (IC8 pin 13). IC8, a 4-input NAND gate, preferably decodes the four most significant bits of the keyboard data to provide a signal which is low only when the ASCII input is, by way of example, in the range ∅6∅ to ∅67 octal. This would normally correspond to pressing a numeral key in the range ∅ to 7. For operator convenience the range desired is numerals 1 to 8 and therefore, the keyboard input is decremented by adding 1 to the inverted four least significant bits in adder IC16. The shift register IC4 is only clocked when a numeral key in the range 1 to 8 is pressed. When this occurs Q1 (IC4 pin 4) goes high and is used to clock the 3-bit binary member into the quad flip-flop IC18. The most significant bit is inverted before being stored in the flip-flop IC18. Q1 going high causes pins 4 and 5 of IC8 to go low resetting IC4. Inverters IC3 cause a delay in resetting IC4 producing a pulse at Q1 of approximately 150 ns, by way of example. The shift register IC4 will also preferably be reset at any time if a key other than the control character or a numeral is pessed, gated at IC9 pins 5 and 6.

If the numeral key pressed was in the range 5-8, output Q2 (IC18 pin 5) will be low. This disables a 2-to-4 line decoder IC23 and inhibits further action. This is necessary as in the above example there are only four outputs as opposed to 8. However, if a numeral key in the range 1 to 4 was pressed then Q2 will be high, enabling IC23, and one of the four output latches IC1-9-IC22 will be enabled by pulling its input EDI (pin 9) low. Pressing further numeral(s), in the range 1 to 8, represents the video input or inputs selected. The number chosen, minus one, is stored in the previously enabled output latch by strobing the clock inputs, pin 7, via IC11 pin 3 which gates $\overline{06}$ and $\overline{STROBE}$. The 3-bit binary number is then preferably output on Q0-Q2 of the latch and passed to the select inputs of its respective 8-to-1 line analogue multiplexer 204 comprised of IC24-IC27. One of eight video inputs, from VS1 to VS8, is therefore selected and appears on the output pin 3, where it is fed to the appropriate output buffer amplifier 208a-208d. The output buffer 208a-208d each consist of a complementary amplifier with a high input impedance and a voltage gain, by way of example, of 2. The gain will increase slightly at high frequencies to compensate for attenuation in the multiplexer 204 and coaxial feed to the VDU. Bias is provided by the video pre-amplifier stage. The output transistor is an emitter follower with a series resistor to give a 75Ω output impedance, by way of example. The facility of selecting video inputs to the enabled screen or output line is preferably available until any key other than numerals 1 to 8 is pressed, whereby IC18 is reset through IC13 pin 4 going low. The Q2 output (IC18 pin 5) now goes low thus disabling decoder IC23, whose outputs all go high. This causes all output latches to maintain their present states regardless of further clock pulses. It should be noted that preferably, the switching sequence can only be re-started by pressing the control character key.

When power is initially applied monostable IC5 is triggered as C46 charges up and produces, by way of example, a 100 ms pulse INIT which is used to clear all latches and shift registers. The four output latches IC1-9-IC22 are preferably wired with inverting gates on some inputs and outputs which do not affect normal operation. But when reset is applied (pin 15), these latches preferably feed the select inputs of IC24-IC27 with binary codes for 0, 1, 2, 3 respectively. This ensures that the video matrix switch 44a powers up such that video input 1 is routed to video output 1, video input 2 to video output 2, etc. If desired, the video outputs may also be reset to this 'default mode' at any time after power-on by pressing the control character key three times in succession. The default mode is preferably achieved by using IC4 which counts the first two key depressions and then sets Q1 (pin 12) high. This allows the third control character gated with $\overline{\text{STROBE}}$ in IC23, to turn on transistor TR29 via a positive going pulse from IC11 (pin 10). C46 is discharged by TR29 and causes IC5 to produce another INIT pulse. IC4 is preferably cleared whenever a key other than the control character key is pressed via pin 12 of IC23.

With respect to the video inputs, preferably each video input signal is fed to a differential amplifier in order to reject hum and provide a low impedance feed for the analogue multiplexers 204. The input impedance of each amplifier may be, by way of example, 10KΩ allowing several inputs to be looped through or alternatively 75Ω termination may be obtained via straps if desired. Common-mode noise or hum on both coaxial cable inner and screen produce identical swings at the emitters of the complementary transistors and, therefore, cause no change in collector current. Only difference-mode signals are amplified with a gain of slightly over unity. The output signal from the preamplifier 206a-206h is taken from the wiper of the preset trimmer potentiometer VR1-VR8, respectively, which compensates for variations in input voltage levels, and bussed to each multiplexer 204. Preferably, each pre-amplifier 206a-206h has its own supply decoupling to minimise cross-channel pick up.

The balance of the circuitry associated with the video matrix switch 44a will be readily understood by one of ordinary skill in the art with reference to FIGS. 9–11, and will not be described in greater detail hereinafter.

Referring now to FIGS. 12–18, a typical keyboard code converter 48a is shown in greater detail. As was previously described, the keyboard code converter 48a is preferably employed when the keyboard codes for the different computer systems with which the common keyboard 28 communicates are not compatible. The keyboard code converter 48a will preferably accept either parallel or serial input and will generate both a parallel and a serial output. The input specifications for the keyboard code converter 48a, by way of example, are for a parallel input, a data format of 7 or 8 bits in any code with any strobe polarity with TTL compatible signal levels; and for a serial input, any asynchronous serial data format at a data speed of 75–9600 bps with RS232c compatible signal levels. With respect to exemplary output specifications for the keyboard code converter 48a, by way of example, for a parallel output, the data format is up to 8 bits, any code, with either positive or negative going strobe at TTL compatible signal levels. By way of example, data is only present on the output lines for 50 ms after the key is depressed. For a serial output, the data format, by way of example, is the same as the serial input if employed; otherwise, any asynchronous format, at a data speed of 75–9600 bps at RS232c compatible signal levels.

In operation, any input character to the keyboard code converter 48a from the keyboard 28 via the keyboard display driver 42a is preferably latched, converted and regenerated with a different code, compatible to the other computer system 40, for example, in both parallel and serial outputs. The required code conversion is preferably stored in PROM 300 and may easily be changed by replacing the PROM 300. Preferably any unused input codes will generate a null output character.

Depending on the desires of the user, the keyboard code converter 48a may have either a parallel or asynchronous serial input of up to eight data bits and can generate both serial and parallel outputs. To implement a particular configuration a number of hard wire-wrap links may be made to the wire-wrap posts, labelled S1 to S34 in FIGS. 13–17. By way of example, various possible configurations are enumerated below. S1 U.A.R.T. receiver clock: link to either S19 for 9600 bps serial input; or S20 for 4800 bps serial input; or S21 for 2400 bps serial input; or S22 for 1200 bps serial input; or S23 for 600 bps serial input; or S24 for 300 bps serial input; or S25 for 150 bps serial input; or S26 for 75 bps serial input. S2 U.A.R.T. received data available: link to S5 if a serial input is to be used. S3 Parallel input strobe: line to S5 if a parallel input is to be used. S4 Input multiplexer select: link to +5 V if a parallel input is to be used or to 0V if a serial input is to be used. S5 F.I.F.O. parallel load: see S2 and S3. S6 U.A.R.T. transmitter clock: link to either S19 for 9600 bps serial input; or S20 for 4800 bps serial input; or S21 for 2400 bps serial input; or S22 for 1200 bps serial input; or S23 for 600 bps serial input; or S24 for 300 bps serial input; or S25 for 150 bps serial input; or S26 for 75 bps serial input. S7 Serial output parity select: link to either 0 V if odd parity is required or +5 V if even parity is required. S8 and S9 Serial output, number of data bits per character: link as below in the following table:

TABLE

| S8 | S9 | |
|---|---|---|
| 0V | 0V | for 5 bits/character |
| +5V | 0V | for 6 bits/character |
| 0V | +5V | for 7 bits/character |
| +5V | +5V | for 8 bits/character |

S10 Serial output, number of stop bits: link to 0 V if 1 stop bit is required or to +5 V if 2 stop bits are required. S11 Serial output parity enable: link to either 0 V if a parity bit is required or to +5 V if no parity bit is required. S12 Inverted serial data link to S14 if an inverted serial output is required. S13 Normal serial data: link to S14 if a non-inverted serial output is required. S14 Serial output line driver: see S12 and S13. S15 Synchronous clock for serial output: link to either S23 for 9600 bps serial output; or S24 for 4800 bps serial output; or S25 for 2400 bps serial output; or S26 for 1200 bps serial output; or S27 for 600 bps serial output; or S28 for 300 bps serial output; or S29 for 150 bps serial output; or S30 for 75 bps serial output. S16 $\overline{\text{MESSAGE VALID}}$ input: link to +5 V. S17 $\overline{\text{MESSAGE OVER}}$ input: link to +5 V. S18 $\overline{\text{STROBE START}}$ input: link to +5 V. S19 to S30 Clock signals: see S1, S6 and S15. S31 PARALLEL IN 8 input: link to 0 V if a seven bit parallel input is to be used, otherwise leave unconnected. S32 Negative strobe drive: link to S34 if a negative going output strobe signal is required. S33 Positive strobe drive: link to S34 if a positive-going output strobe signal is required. S34 Output strobe: see S32 and S33. S35 Strobe null inhibit: goes low if a null character is generated. S36 Strobe inhibit: link to S35 if no strobe is required for a null character, otherwise link to +5 V. S37 Parallel input strobe: link to S38 if it is a positive going pulse or to S39 if it is a negative going pulse. S38 see S37. S39 see S37.

Figure 12:
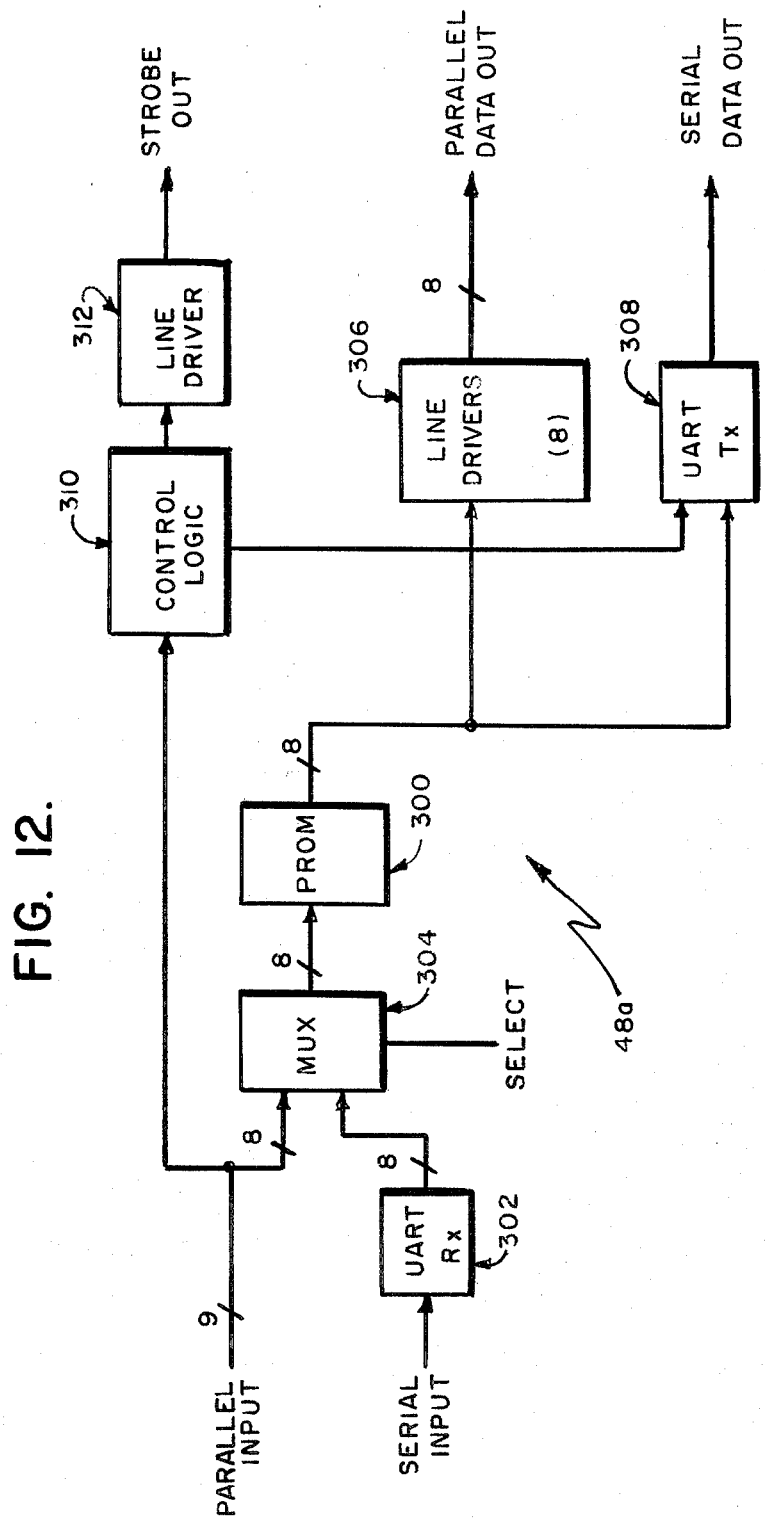
FIG. 12 is a functional block diagram of the keyboard code converter portion of the system of FIG. 1.
Figure 13A:
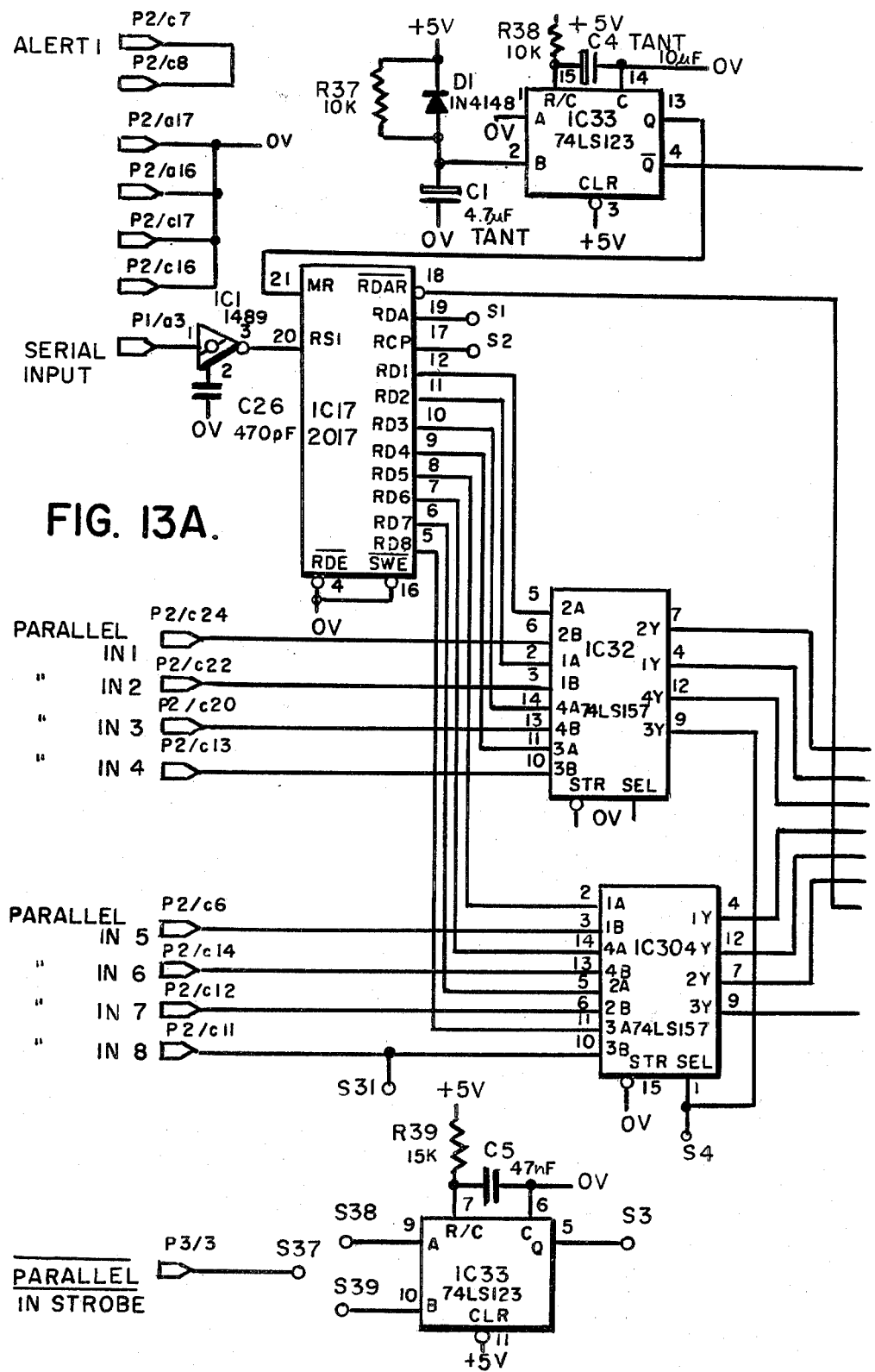
Figure 13B:
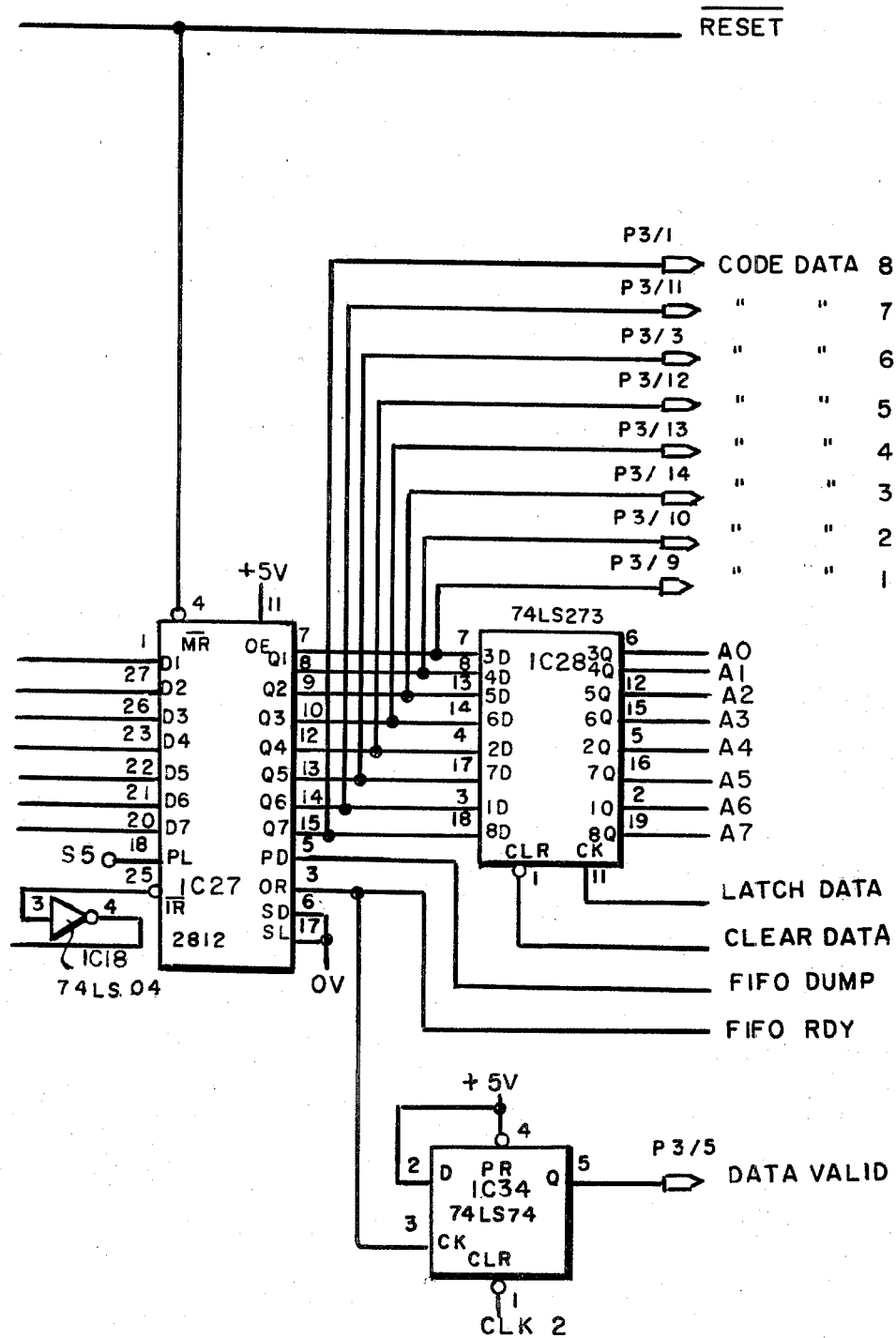

As shown and preferred to FIG. 12, the keyboard code converter 48a preferably includes a receiver U.A.R.T. 302 on the serial input whose output is connected to a multiplexer 304 which selects between the serial and parallel inputs, and provides the input to the PROM 300. The output of the PROM 300 is connected in parallel to a plurality of line drivers 306 such has 8, and to a tramsmitter U.A.R.T. 308, with the line drivers 306 providing the parallel data output and the U.A.R.T. 308 providing the serial data output under control of control logic 310 which receives a strobe signal. The control logic 310 provides a strobe output signal via a line driver 312.

The keyboard code converter 48a can accept either parallel or serial inputs, as previously described, with this option being strap selectable. If a parallel input is selected, the seven or eight data lines are selected by IC30 and IC32 (FIG. 13) which are quad 2-to-1 line multiplexers. The selected data is then loaded into IC27, a 32×8 F.I.F.O. register, by the positive going edge of the debounced keyboard strobe line. If the serial input is chosen the parallel data is provided by IC17, a U.A.R.T. 302-308. The serial input line is converted from the RS232c levels to TTL compatible levels by IC1/1 and is then input to the U.A.R.T. IC17. The U.A.R.T. IC17 is strapped to conform to the input format required and generates a parallel output of the data. This is then selected by IC30 and IC32 and loaded into IC27 on the rising edge of the RDA signal. The U.A.R.T. IC17 receiver buffer is cleared by the inverted $\overline{IR}$ signal going low temporarily as the data is loaded into the F.I.F.O. Both IC17 and IC27 are reset on power-up by the monostable circuit IC31 and associated passive components.

Now considering the control logic 301 (FIGS. 15-16), when data has rippled to the output stage of the FIFO, the OR signal goes high. The rising edge of OR is used to generate the CLK1 signal. This is done by clocking the Q output of flip-flop IC8/1 to a high state which, when gated with the CLK1 signal ($\overline{Q}$ output of IC6/1) sets the J input of flip-flop IC6/1 to a high level. The next rising edge of the, by way of example, 153.6 KHZ clock, 153K6 CLK, sets IC6/1 $\overline{Q}$ low which causes the J input to go low and clears the latch IC8/1. The next rising edge of the clock then resets CLK1 high in which state it remains until the next time OR goes high. CLK1 is thus a single negative going pulse of 3.25 us duration, by way of example. The trailing edge of CLK1 generates CLK2 in the same manner. CLK1 is also gated with the Q output of IC29/1 (labelled A8) to generate the clock input to flip-flop IC29/1. The D input to IC29/1 is tied high to 5 V keeping A8 high. The bistable IC29/2 acts as a one character delay on the steering logic. In normal operation IC29/1 $\overline{Q}$ is at low level and this holds IC29/2 in the cleared condition. In this state CLK3 is gated such that it generates the CLEAR DATA and FIFO DUMP signals. The signal CLK3 is used to clear the input character from the latch and FIFO after a reasonable period of time. On the rising edge of the LATCH DATA signal the Q output of IC11/1 is clocked high enabling the exemplary 300 Hz clock signal (300 CLK) to the input of IC13, a four bit binary counter. When a count of 15, by way of example, has been reached the 'ripple carry' output produces a positive-going signal which lasts for half a clock cycle. This is CLK3 and it also initiates the generation of a single negative going pulse which clears the bistables and the counter, resetting the circuit until the next rising edge of LATCH DATA. The CLK3 thus gnerated is of 1.7 ms duration, by way of example, and occurs approximately 50 ms after the data is latched into the code converter 48a.

Figure 14A:
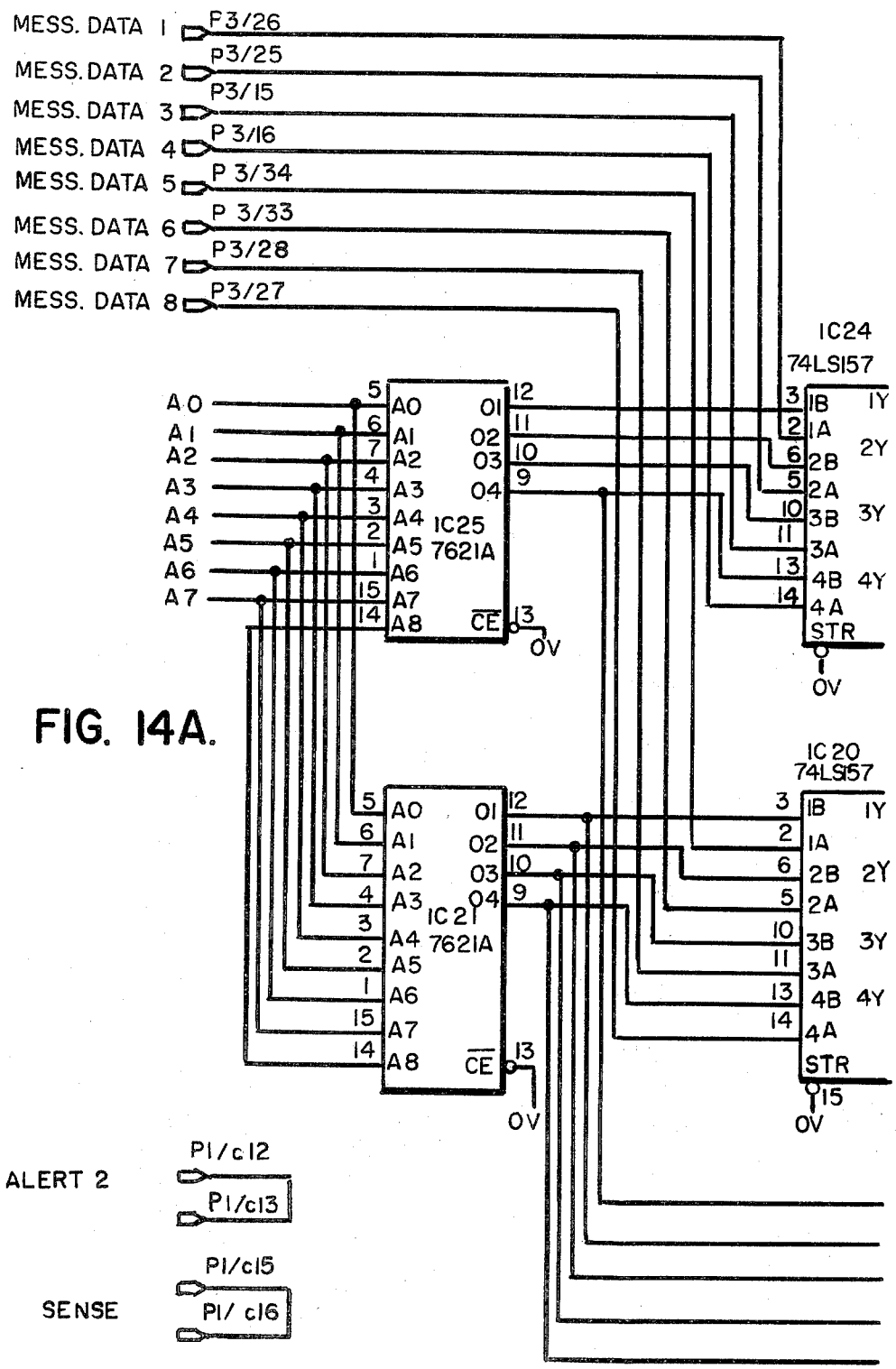
Figure 14B:
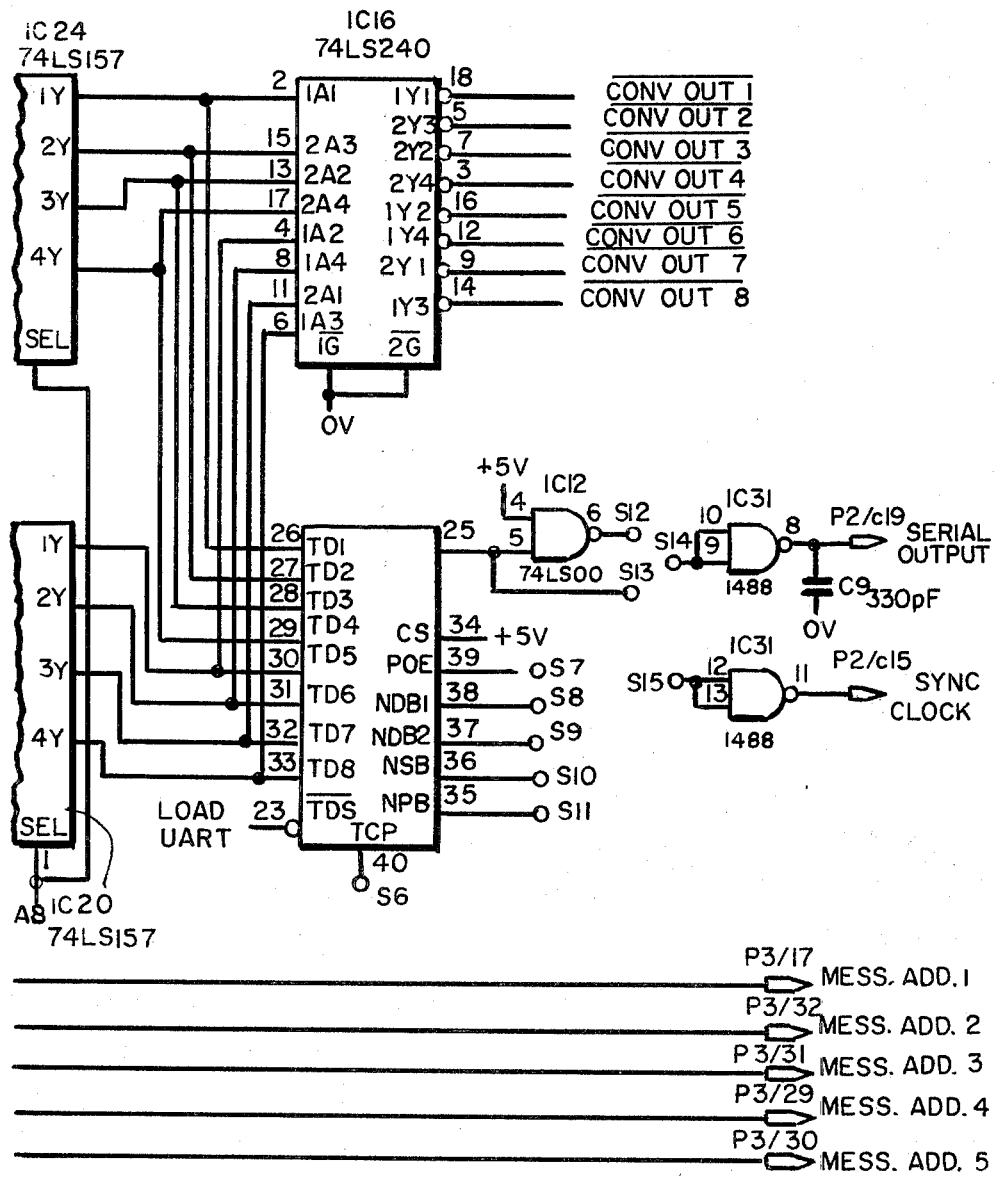

Now decribing the code conversion operation of code converter 48a with reference to FIG. 14. The incoming data from IC27, the FIFO is loaded into IC28, an octal D-type latch, by the LATCH DATA signal. The eight latched outputs provide the lowest eight address lines to the two code conversion PROM's IC21 and IC25 comprising PROM 300, which PROM's are, by way of example, 512×4 types. All the output lines preferably go to the 'B' inputs of IC20 and IC24, which are quad 2-to-1 line multiplexers. Since A8 is high, the multiplexer outputs, which are the 'B' inputs, are selected giving the converted codes on the outputs. The eight data lines from the multiplexers IC20 and IC24 are buffered and preferably inverted by IC16 and then drive the transistor driver stages. Each of these is preferably identical, consisting of a 2N3906 transistor between 0 V and 5 V, by way of example. The strobe driver is preferably the same as the data drivers. By way of example, the normal levels are 0 V for a 'zero' data bit and 5 V for a 'one' data bit. The strobe level is selectable to be either positive or negative going.

Figure 15:
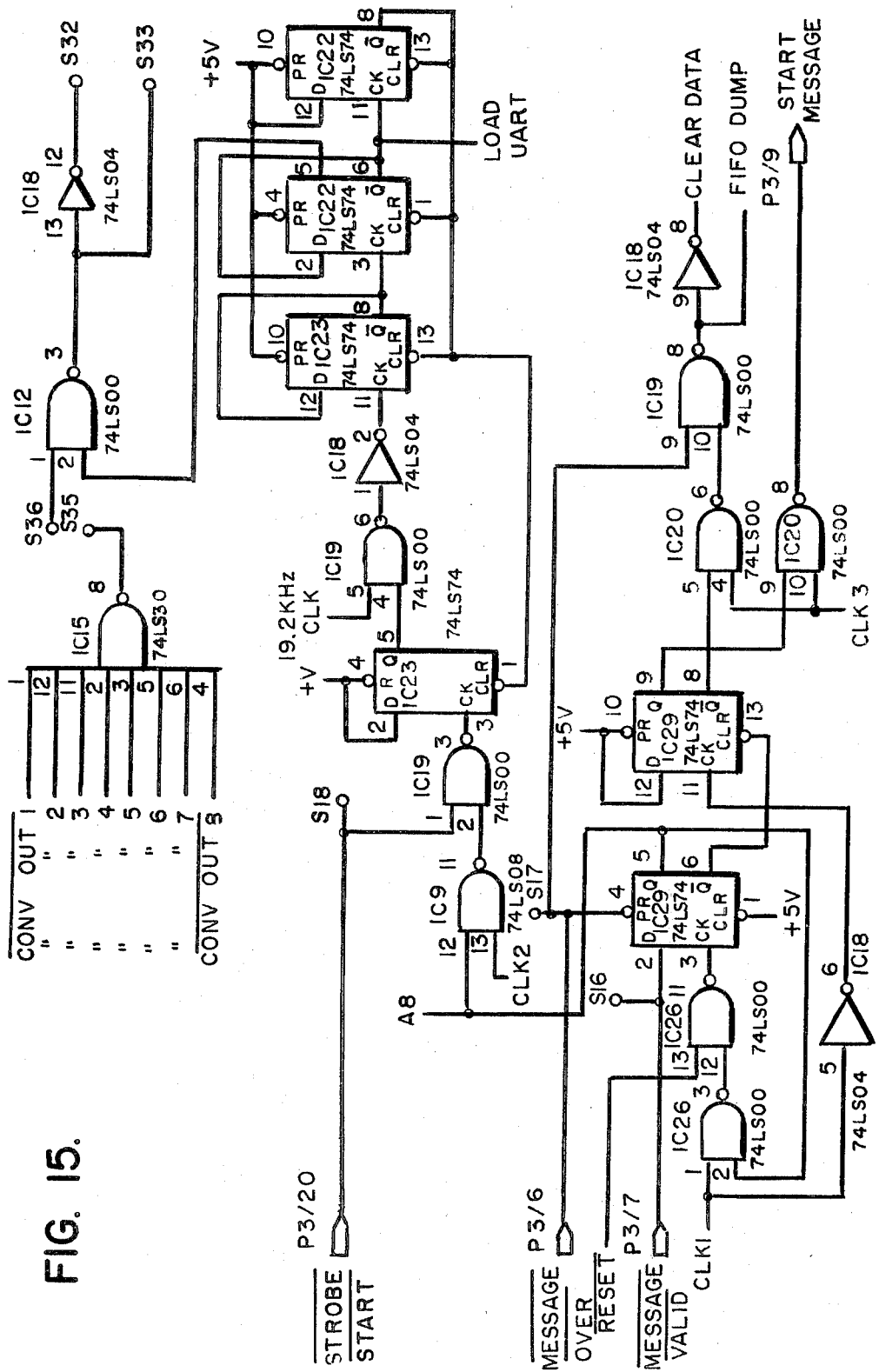
Figure 16:
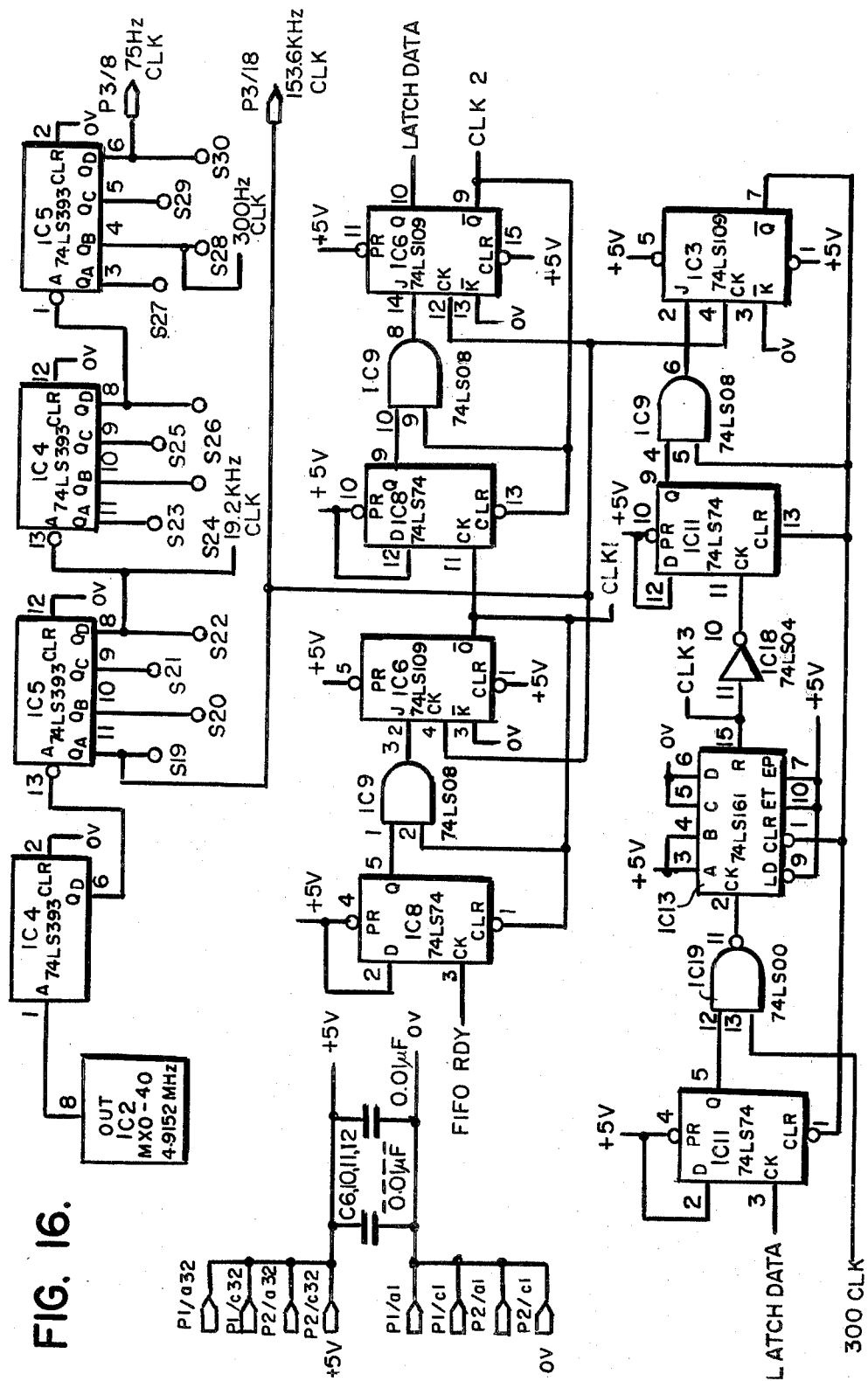

The strobe logic is shown in FIG. 15. Generation of the strobe pulse is initiated by the negative-going type of CLK2. The clocking of IC23/1 enables the 19.2 KHz clock to IC23/2 and IC22/1 which are connected as a divide-by-four counter. The Q output of IC22/1 is used to generate the strobe pulse and the trailing edge of the signal generates the reset to the four bistables. The strobe generated is of 104 us duration, by way of example, and will preferable occur between 52 and 104 us, by way of exaple, after data becomes valid. The sense of the strobe is selectable to be either positive or negative going. The $\overline{Q}$ output of IC22/1 is also the LOAD UART signal which initiates the asynchronous serial output. If desired, the strobe can be disabled when the output character is a null by gating the output of IC15 with the strobe signal itself. This feature is preferably strap selectable.

The serial output (FIG. 14) is generated by the transmitter of UART IC17. The format and speed of the asynchronous signal is preferably fully selectable by strapping the control signals to either +5 V or 0 V. Data is presented to the UART IC17 parallel inputs from the multiplexers IC20 and IC24. Transmission is initiated by the LOAD UART signal on the $\overline{TDS}$ pin. The TTL level serial data is preferably available either inverted or non-inverted and either can be connected to the EIS level driver, IC31. In addition, a synchronous clock is available and the frequency of this may be selected by strapping to the appropriate clock. With respect to the clock source for the keyboard code converter 48a, this clock source is preferably a single chip crystal oscillator, IC2 which produces a TTL compatible signal at 4.9152 MHz, by way of example. The required clock frequencies are then derived from this signal by a divider chain consisting of IC4 and IC5, which are dual four-bit binary counters.

FIG. 18 is an overall timing diagram for the operation of the keyboard code converter 48a of FIGS. 12-17. The balance of the circuitry will be readily understood by one of ordinary skill in the art with reference to FIGS. 12-17 and the timing diagram of FIG. 18 and need not be described in greater detail hereinafter.

By utilizing the system 20 of the present invention, a common keyboard used to communicate with various computer systems may be employed to enable selection of simultaneously provided plural video displays on a single VDU.

It is to be understood that the above described embodiments of the invention are merely illustrative of the principles thereof and that various modifications may be carried out without departing from the spirit and scope of the present invention such as by utilizing a serial-to-video interface between a VDU and a computer system when the circumstances require.

What is claimed is:

1. In a video communication network capable of providing a plurality of simultaneous different textual data video frames to a plurality of keystations, said video frames comprising textual data provided from a plurality of computer systems each capable of providing a portion of said plurality of simultaneous textual data video frames to said network, each keystation comprising a single keyboard means for inputting at least data control signals to said plurality of computer systems for controlling the provision of said textual data from said computer systems, each keystation further comprising at least one associated video display means for selectively video displaying one of said plurality of simultaneously provided textual data video frames, each of said simultaneously provided different textual data video frames being definable by a different simultaneously provided composite video input signal to said keystation, each keystation comprising means for receiving said plurality of simultaneously provided composite video input signals; the improvement comprising keyboard display driver interface means selectively connected between said single keyboard means at each keystation and any one of said plurality of computer systems in an enabled state for dynamically selectively connecting said single keyboard means at any keystation to any one of said computer systems for enabling communication therewith in said enabled state, said plurality of computer systems comprising at least two different data bases having incompatible keyboard protocols or character codes; and video matrix switch means operatively connected to said video display means, to said keyboard means and to said composite video signal receiving means at at least one of said plurality of keystations in said network for multiplexing said plurality of simultaneously provided composite video input signals and detecting a plurality of unique keyboard generated character codes from said keyboard means of said one keystation for enabling dynamic selection of any one of said plurality of simultaneously provided different composite video input signals provided to said video matrix switch means in response to detection of at least a predetermined one of said unique keyboard generated character codes for dynamically routing any one of said simultaneously provided composite video input signals to said video display means of said one keystation for enabling said video display of said corresponding selected textual data video frame, said keyboard display driver interface means being capable of detecting a plurality of unique keyboard generated character codes from said keyboard means for enabling said dynamic selective connection of said keyboard means to one of said different data base computer systems for enabling said enabled state communication therewith, said network further comprising keyboard code conversion means operatively connected between said keyboard display driver interface means and said one keyboard means for converting incompatible keyboard character codes or protocols from said one keyboard means into keyboard character codes or protocols compatible with each of said different data bases dependent on the data base to be selectively communicated with through said one keyboard means; whereby a single keystation keyboard may be used both to selectively communicate with a plurality of different data base computer systems having incompatible keyboard protocols or character codes and to enable keyboard generated dynamic selection of a textual data video display from a plurality of simultaneously provided composite video signals from said plurality of different data base computer systems.

2. An improved network in accordance with claim 1 wherein one of said plurality of unique keyboard generated character codes is a keyboard display driver disable code, said keyboard display driver interface means comprising means responsive to said disable code for placing said keyboard display driver interface means in a disable state in which said keyboard display driver interface means is disconnected from said computer systems, said disable code at least being provided in association with said video matrix switch means being in a switching sequence.

3. An improved network in accordance with claim 1 wherein said video matrix switch means comprises an analog multiplexer means for multiplexing said plurality of simultaneously provided composite video inputs.

4. An improved network in accordance with claim 3 wherein said video matrix switch means further comprises select and decode logic means operatively connected between said one keystation keyboard means and said analog multiplexer means for detecting said unique keyboard generated character codes and dynamically routing said multiplexer video inputs to said multiplexer output for providing said video signal corresponding to said selected textual data video frame to said video display means.

5. An improved network in accordance with claim 4 wherein said analog multiplexer comprises eight video input lines for said video input signals and four video output lines for selectively providing said video input signals to said video display means, with any off said video input lines being capable of being dynamically routed to any one of said video output lines, said one video display means being selectively connected to one of said video output lines.

6. An improved network in accordance with claim 3 wherein said video matrix switch means further comprises select and decode logic means operatively connected between said one keystation keyboard means and said analog multiplexer means for detecting said unique keyboard generated character codes and dynamically routing said multiplexer video inputs to said multiplexer output for providing said video signal corresponding to said selected textural data video frame to said video display means.

7. An improved network in accordance with claim 3 wherein said analog multiplexer comprises a plurality of video input lines corresponding to said plurality of simultaneously provided video inputs and a plurality of video output lines for providing said video signals to said video display means, with any one of said video input lines being capable of being dynamically routed to any one of said video output lines, said one video display means being selectively connected to one of said video output lines.

8. An improved network in accordance with claim 7 wherein said video matrix switch means further comprises select and decode logic means operatively connected between said one keystation keyboard means and said analog multiplexer means for detecting said unique keyboard generated character codes and dynamically routing siad multiplexer video inputs to said multiplexer output for providing said video signal corresponding to said selected textual data video frame to said video display means.

9. An improved network in accordance with claim 1 wherein at least said one keystation further comprises a plurality of video display means associated with said single keyboard means with each of said plurality of video display means being capable of independently simultaneously providing a video display of any one of said simultaneously provided textual data video frames, said video matrix switch means being capable of dynamically routing any one of said simultaneously provided composite video input signals to any one of said plurality of video display means in response to detection of a predetermined one of said unique keyboard generated character codes for enabling simultaneous video display of different simultaneously provided textual data video frames on each of said plurality of video display means, each one of said plurality of video display means being delectively connected to a different one of said video output lines.

10. An improved network in accordance with claim 9 wherein said video matrix switch means comprises an analog multiplexer means for multiplexing said plurality of simultaneously provided composite video inputs.

11. An improved network in accordance with claim 10 wherein said analog multiplexer comprises a plurality of video input lines corresponding to said plurality of simultaneously provided video inputs and a plurality of video output lines for providing said video signals to said video display means, with any one of said video input lines being capable of being dynamically routed to any one of said video output lines.

12. An improved network in accordance with claim 11 wherein said video matrix switch means further comprises select and decode logic means operatively connected between said one keystation keyboard means and said analog multiplexer means for detecting said unique keyboard generated character codes and dynamically routing said multiplexer video inputs to said multiplexer output for providing said video signal corresponding to said selected textual data video frame to said video display means.

13. An improved network in accordance with claim 1 wherein at least one of said computer systems provides said textual data as digital data, said network further comprising terminal controller interface means operatively connected between said one computer system, said keyboard display driver means and said video matrix switch means for converting said digital data from said one computer system into said composite video input signals to said video matrix switch means.

14. An improved network in accordance with claim 13 wherein said terminal controller interface means comprises display driver means, said display driver means comprising local video display storage means for locally storing said digital data as textual data for providing a video display thereof and video signal generation means for providing said composite video input signal to said video matrix means from said locally stored textual data.

15. An improved network in accordance with claim 13 wherein said video matrix switch means comprises an analog multiplexer means for multiplexing said plurality of simultaneously provided composite video inputs.

16. An improved network in accordance with claim 15 wherein said analog multiplexer comprises a plurality of video input lines corresponding to said plurality of simultaneously provided video inputs and a plurality of video output lines for providing said video signals to said video display means, with any one of said video input lines being capable of being dynamically routed to any one of said video output lines, said one video display means being selectively connected to one of said video output lines.

17. An improved network in accordance with claim 13 wherein at least said one keystation further comprises a plurality of video display means associated with said single keyboard means with each of said plurality of video display means being capable of independently simultaneously providing a video display of any one of said simultaneously provided textual data video frames, said video matrix switch means being capable of dynamically routing any one of said simultaneously provided composite video input signals to any one of said plurality of video display means in response to detection of a predetermined one of said unique keyboard generated character codes for enabling simultaneous video display of different simultaneously provided textual data video frames on each of said plurality of video display means, each one of said plurality of video display means being selectively connected to a different one of said video output lines.

18. An improved network in accordance with claim 17 wherein said video matrix switch means comprises an analog multiplexer means for multiplexing said plurality of simultaneously provided composite video inputs.

19. An improved network in accordance with claim 18 wherein said analog multiplexer comprises a plurality of video input lines corresponding to said plurality of simultaneously provided video inputs and a plurality of video output lines for providing said video signals to said video display means, with any one of said video input lines being capable of being dynamically routed to any one of said video output lines.

20. An improved network in accordance with claim 1 wherein said keyboard code conversion means comprises means for retrievably storing the required code conversion for converting any of said incompatible keyboard character codes of said selected data base into keyboard character codes compatible therewith.

21. An improved network in accordance with claim 20 wherein said code conversion storing means comprises programmable memory means.

22. An improved network in accordance with claim 21 wherein said programmable memory means comprises PROM.

23. An improved network in accordance with claim 23 wherein said PROM comprises a PROM removably interchangeable with another PROM having a different stored code conversion for a different incompatible data base.

24. An improved network in accordance with claim 1 wherein said different data base computer systems comprise a host computer system and a subscriber computer system, said keyboard character codes associated with said subscriber computer system being said incompatible keyboard character codes requiring said code conversion.

* * * * *